US012716250B2

(12) United States Patent
Morimura et al.

(10) Patent No.: US 12,716,250 B2
(45) Date of Patent: Aug. 25, 2026

(54) BINDING MACHINE

(71) Applicant: Max Co., Ltd., Tokyo (JP)

(72) Inventors: Kouichirou Morimura, Tokyo (JP); Takahiro Ito, Tokyo (JP); Terufumi Hamano, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 18/782,125

(22) Filed: Jul. 24, 2024

(65) Prior Publication Data

US 2024/0376728 A1 Nov. 14, 2024

Related U.S. Application Data

(63) Continuation of application No. 17/720,933, filed on Apr. 14, 2022, now Pat. No. 12,065,846.

(30) Foreign Application Priority Data

Apr. 16, 2021 (JP) ................................ 2021-069931
Mar. 11, 2022 (JP) ................................ 2022-038054

(51) Int. Cl.
*E04G 21/12* (2006.01)
*B25B 25/00* (2006.01)
*B25B 28/00* (2006.01)

(52) U.S. Cl.
CPC ............ *E04G 21/123* (2013.01); *B25B 25/00* (2013.01); *B25B 28/00* (2013.01)

(58) Field of Classification Search
None
See application file for complete search history.

(56) References Cited

U.S. PATENT DOCUMENTS

2006/0254666 A1* 11/2006 Kusakari ............... E04G 21/122 140/57
2013/0105188 A1 5/2013 Sakamaki et al.
2014/0048301 A1 2/2014 Okouchi et al.
2016/0211730 A1 7/2016 Niwa
2017/0218631 A1 8/2017 Matsuno
2017/0225315 A1 8/2017 Okouchi et al.
(Continued)

FOREIGN PATENT DOCUMENTS

CN 101353088 A 1/2009
CN 105798852 A 7/2016
(Continued)

OTHER PUBLICATIONS

Aug. 8, 2024—(AE) Office Action—App P6000678/2022.

*Primary Examiner* — Debra M Sullivan
(74) *Attorney, Agent, or Firm* — Banner & Witcoff, Ltd.

(57) ABSTRACT

A binding machine includes a main body, a wire feeder, a curl forming part, a cutter configured to cut the wire wound on the object to be bound, a binding part including a rotating shaft, a handle provided on one side of the main body in a first direction intersecting an axial direction of the rotating shaft, a blower configured to generate an air flow through an inside of the main body; and an exhaust port provided on one side or another side of the main body in a second direction intersecting the axial direction of the rotating shaft and an extending direction of the handle, and configured to exhaust air generated by the blower and passed through the inside of the main body.

10 Claims, 17 Drawing Sheets

(56) References Cited

U.S. PATENT DOCUMENTS

| | | | |
|---|---|---|---|
| 2019/0091819 | A1 | 3/2019 | Mori et al. |
| 2019/0381618 | A1 | 12/2019 | Furusawa |
| 2020/0002962 | A1 | 1/2020 | Kawazoe |
| 2020/0215679 | A1 | 7/2020 | Tamura et al. |
| 2020/0248468 | A1 | 8/2020 | Lu et al. |
| 2021/0016405 | A1 | 1/2021 | Mori et al. |
| 2022/0337122 | A1 | 10/2022 | Herr |

FOREIGN PATENT DOCUMENTS

| | | | | |
|---|---|---|---|---|
| CN | 106143983 | A | * 11/2016 | ........... B65B 13/025 |
| CN | 111604866 | A | 9/2020 | |
| EP | 1655226 | A1 | 5/2006 | |
| GB | 2055740 | A | 3/1981 | |
| JP | H09-11157 | A | 1/1997 | |
| JP | 2000263461 | A | 9/2000 | |
| JP | 4144473 | B2 | 9/2008 | |
| JP | 2010-207992 | A | 9/2010 | |
| JP | 2011-148068 | A | 8/2011 | |
| JP | 2013-107183 | A | 6/2013 | |
| JP | 2014-037037 | A | 2/2014 | |
| JP | 2016144856 | A | 8/2016 | |
| JP | 2018-001284 | A | 1/2018 | |
| JP | 2019-063889 | A | 4/2019 | |
| JP | 2019-130645 | A | 8/2019 | |
| JP | 2019-217590 | A | 12/2019 | |
| WO | 2013-032372 | A1 | 3/2013 | |
| WO | 2019-065088 | A1 | 4/2019 | |
| WO | 2021-048025 | A1 | 3/2021 | |

* cited by examiner

BINDING MACHINE

CROSS-REFERENCE TO RELATED APPLICATIONS

This application is a continuation of U.S. patent application Ser. No. 17/720,933 filed Apr. 14, 2022 which claims priority to Japanese Patent Applications No. 2021-069931 filed on Apr. 16, 2021 and No. 2022-038054 filed on Mar. 11, 2022, the contents of which are incorporated herein by reference.

TECHNICAL FIELD

The present disclosure relates to a binding machine for binding an object to be bound such as a reinforcing bar or the like with a wire.

BACKGROUND ART

Reinforcing bars are used in concrete structures to improve their strength, and the reinforcing bars are bound with wires so as not to be shifted from the specified position upon concrete placement.

A binding machine called a reinforcing bar binding machine has been proposed, which winds a wire around two or more reinforcing bars and twists the wire wound on the reinforcing bars to thus bind the two or more reinforcing bars with the wire.

The reinforcing bar binding machine includes a binding wire feeding mechanism for feeding a binding wire such as a wire and the like, and a binding wire twisting and wrenching mechanism for twisting the binding wire. The binding wire feeding mechanism and the binding wire twisting mechanism are driven by a motor, and as the motor is driven, the temperature of the motor rises, and the rising temperature of the motor causes the temperature inside the housing to rise. When the wire diameter is increased in order to increase the binding strength, high output is required for the motor to twist the wire. Further, in a reinforcing bar binding machine having a configuration in which the wire is fed in opposite directions to be wound around the reinforcing bars, the high output is required for the motor to feed the wire. Since a high-power motor generates a large amount of heat, it is necessary to cool the inside of the housing. Further, in continuous work, the motor is stopped for short time, and the temperature of the motor is unlikely to drop.

Therefore, a reinforcing bar binding machine has been proposed, in which a cooling fan and an exhaust slit are arranged at the rear end of the housing as a cooling means inside the housing (see, for example, JP 4144473 B).

However, in a reinforcing bar binding machine in which a cooling fan and an exhaust slit are arranged at the rear end of the housing, the dimensions of the housing along the axial direction of the twisting shaft increase in the front and rear directions. With a form that provides a handle, it has a shape in which the housing behind the handle extends rearward, leading to deteriorated feeling of use. Further, in the usage mode of the reinforcing bar binding machine, since the exhaust slit faces upward, dust, moisture, and the like easily enter the housing through the exhaust slit.

SUMMARY OF INVENTION

The present disclosure has been made in order to solve the problem discussed above, and it is an object of the present disclosure to provide a binding machine capable of forced cooling and suppressing an increase in dimensions in the front and rear directions.

According to an embodiment of the present disclosure, there is provided a binding machine including: a main body; a wire feeder driven by one driving part including a motor and configured to feed a wire; a curl forming part making a path for looping the wire fed by the wire feeder around an object to be bound; a cutter configured to cut the wire wound on the object to be bound; a binding part including a rotating shaft for operating a wire locking body to which the wire is locked, the binding part being driven by another driving part including a motor and being configured to twist the wire; a handle provided on one side of the main body in a first direction intersecting an axial direction of the rotating shaft; a blower configured to generate an air flow through an inside of the main body; and an exhaust port provided on one side or another side of the main body in a second direction intersecting the axial direction of the rotating shaft and an extending direction of the handle, and configured to exhaust air generated by the blower and passed through the inside of the main body.

In the embodiment of the present disclosure, as the blower is driven, a flow of air is generated, which is passed through the inside of the main body and exhausted to the outside.

According to the embodiment of the present disclosure, air is flowed into the main body from the outside, and the air with increased temperature in the main body is exhausted to the outside, so that the temperature rise in the main body can be suppressed. Therefore, it is possible to suppress the temperature rise of the motor or the like. Further, since the blower is not provided on the rear surface of the main body, it is possible to suppress an increase in the dimension of the main body along the axial direction of the rotating shaft. Further, according to the present disclosure, while the handle is being gripped and one side of the rotating shaft of the reinforcing bar binding machine in the axial direction is used facing downward or sideways, the exhaust port does not face upward. This makes it possible to prevent moisture such as rainwater, dust, and the like from entering the housing through the exhaust port.

DESCRIPTION

DESCRIPTION OF EMBODIMENTS

Hereinafter, an example of a reinforcing bar binding machine as an embodiment of the binding machine according to the present disclosure will be described with reference to the drawings. In the present embodiment, side surfaces, an upper surface, a lower surface, a front surface, and a rear surface forming a main body of the reinforcing bar binding machine each include a flat surface and a curved surface.

First Embodiment

Figure 1A:
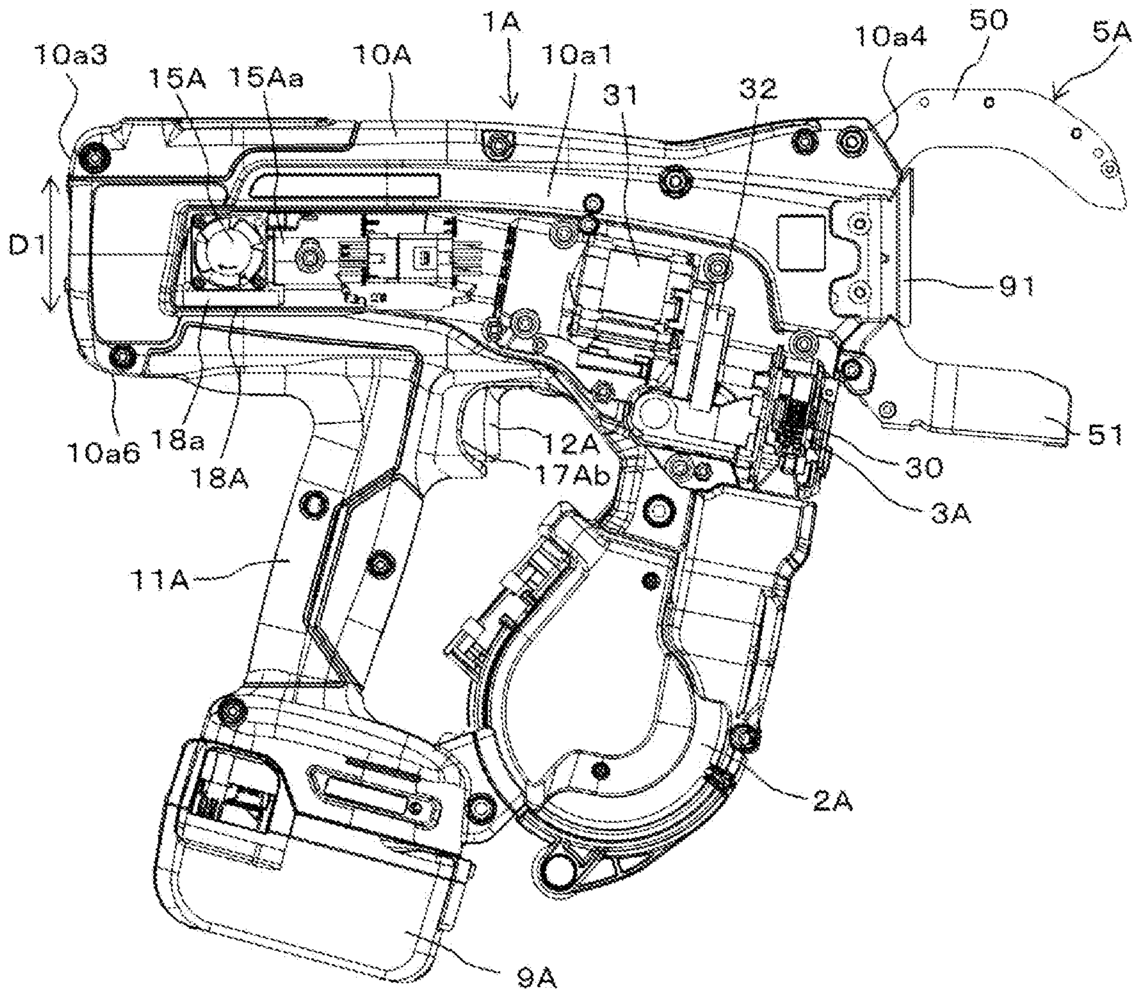
FIG. 1A is a partially exploded side view, seen from one side, illustrating an example of an overall configuration of a reinforcing bar binding machine according to a first embodiment.
Figure 1B:
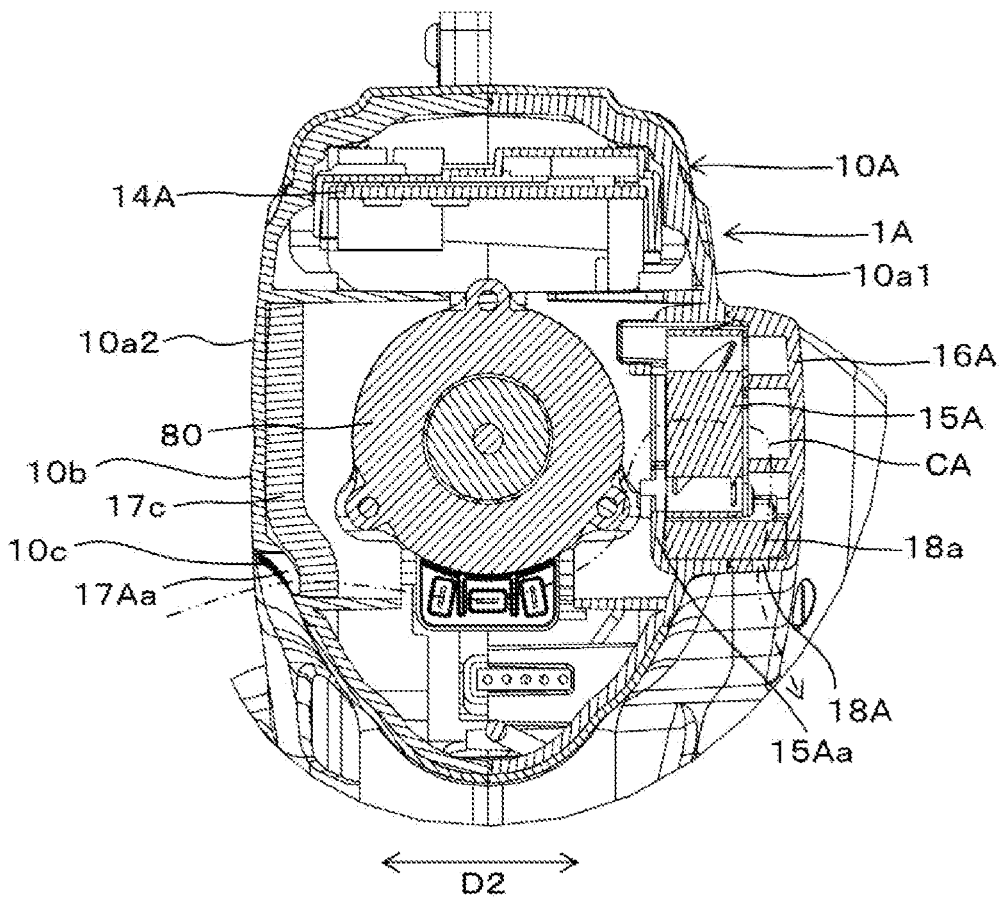
FIG. 1B is a rear sectional view illustrating an example of a configuration of a main part of the reinforcing bar binding machine according to the first embodiment.
Figure 2A:
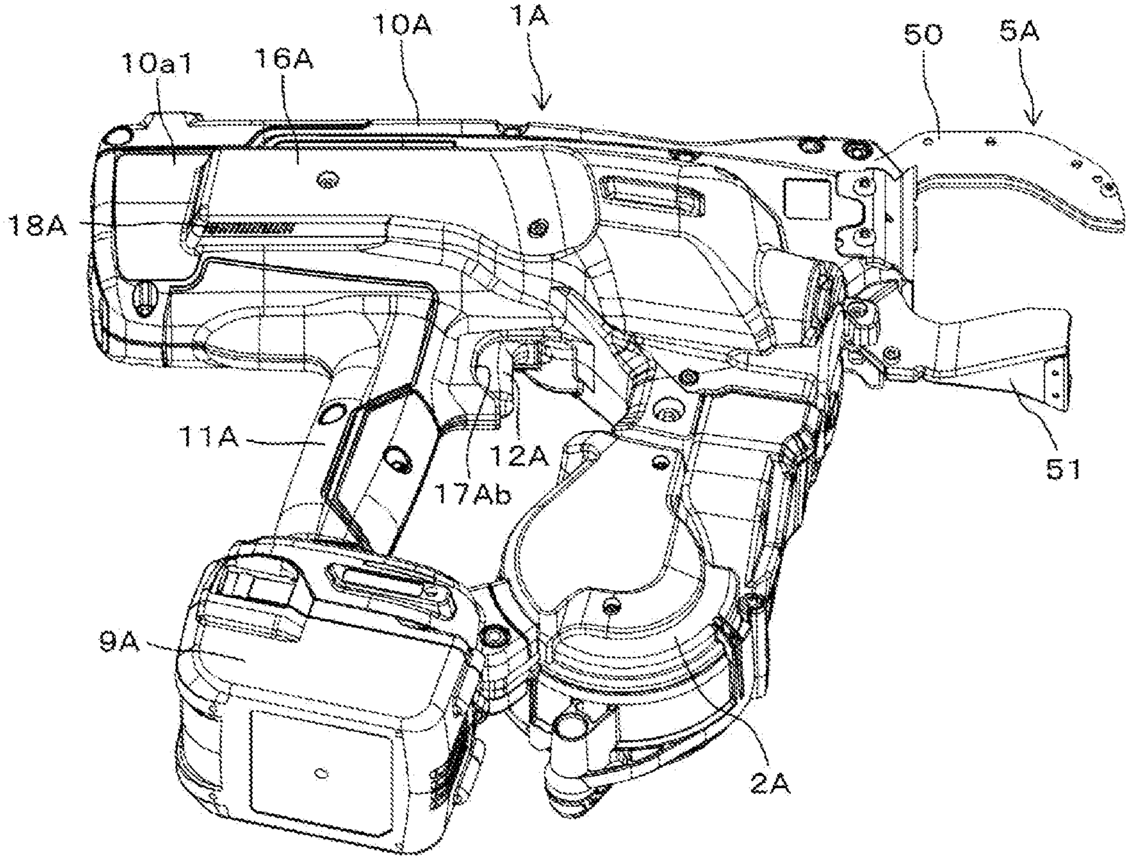
FIG. 2A is an external perspective view seen from below, illustrating an example of the overall configuration of the reinforcing bar binding machine according to the first embodiment on the one side.
Figure 2B:
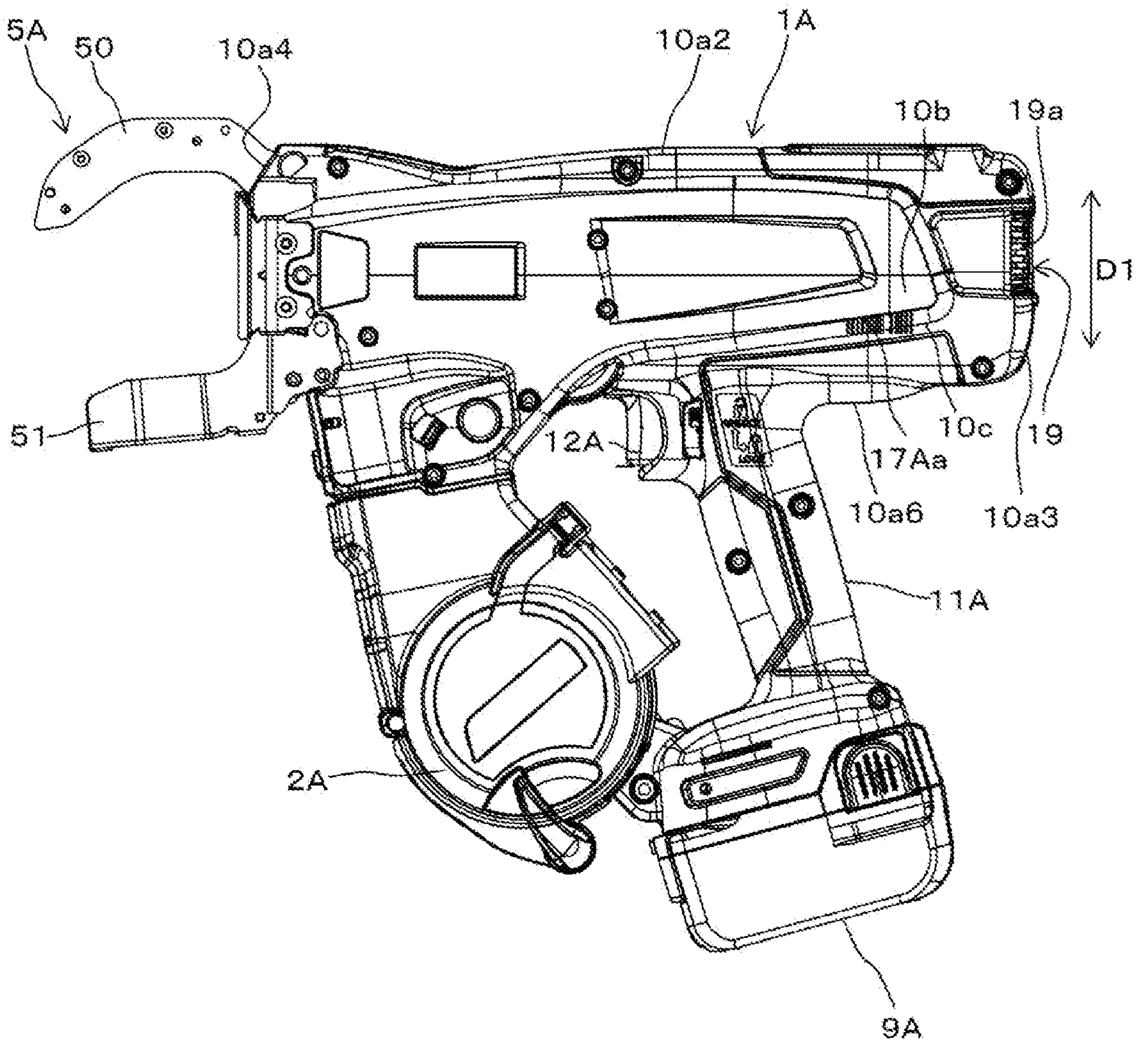
FIG. 2B is an external side view, seen from the other side, illustrating an example of the overall configuration of the reinforcing bar binding machine according to the first embodiment.
Figure 3A:
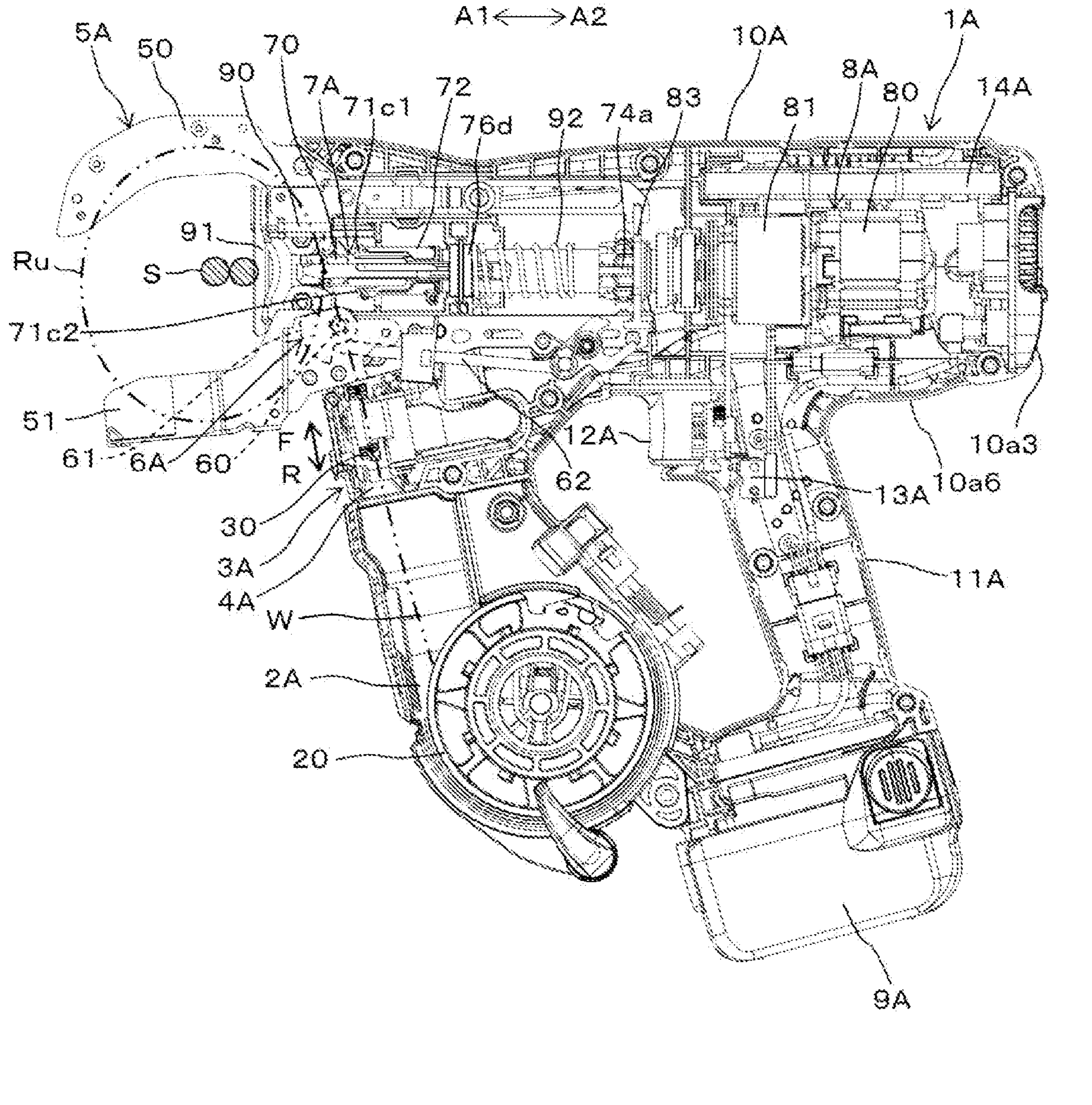
FIG. 3A is an internal configuration diagram, seen from the other side, illustrating an example of the overall configuration of the reinforcing bar binding machine according to the first embodiment.
Figure 3B:
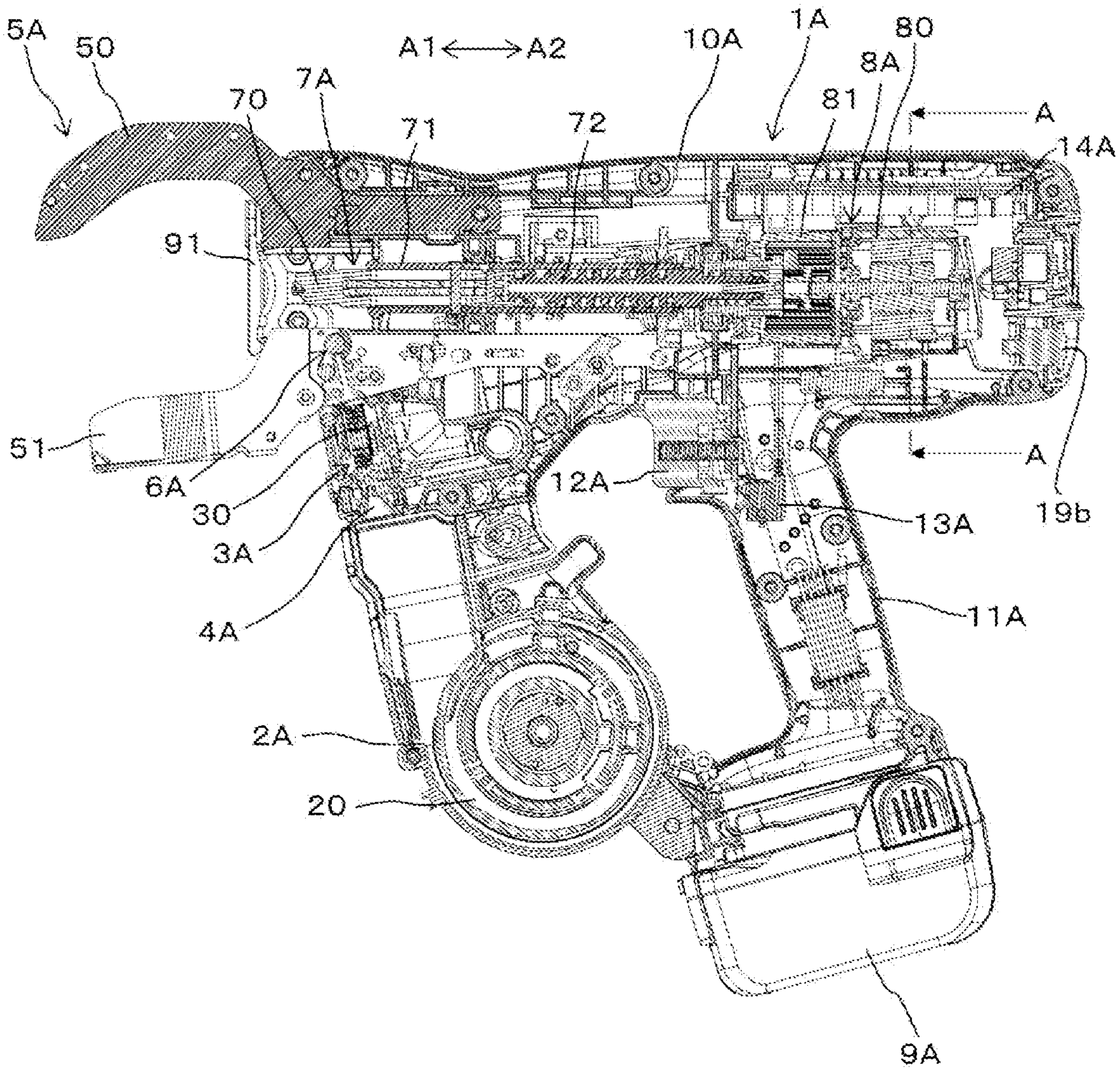
FIG. 3B is an internal configuration diagram, seen from the other side, illustrating an example of the overall configuration of the reinforcing bar binding machine according to the first embodiment.

Configuration Example of Reinforcing Bar Binding Machine According to Embodiment FIG. 1A is a partially exploded side view, seen from one side, illustrating an example of the overall configuration of the reinforcing bar binding machine according to the embodiment, and FIG. 1B is a rear sectional view illustrating an example of the main part configuration of the reinforcing bar binding machine according to the embodiment. FIG. 2A is an external perspective view seen from below, illustrating an example of the overall configuration of the reinforcing bar binding machine according to the embodiment on the one side, and FIG. 2B is an external side view, seen from the other side, illustrating an example of the overall configuration of the reinforcing bar binding machine according to the embodiment. Further, FIGS. 3A and 3B are internal configuration diagrams, seen from the other side, illustrating an example of the overall configuration of the reinforcing bar binding machine according to the embodiment. FIG. 1B is a cross-sectional view taken along the line A-A of FIG. 3B.

A reinforcing bar binding machine 1A has such a form that an operator holds it in his/her hand to use, and includes a main body 10A and a handle 11A provided on a lower surface 10*a*6 of the main body 10A on one side in a first direction D1. Further, the reinforcing bar binding machine 1A feeds a wire W in a positive direction as indicated by an arrow F to loop the wire W around reinforcing bars S that are the object to be bound, feeds the wire W looped around the reinforcing bars S in the reverse direction as indicated by an arrow R to wind the wire W on the reinforcing bars S and cuts the wire W, and then twists the wire W and binds the reinforcing bars S with the wire W.

In order to achieve the functions mentioned above, the reinforcing bar binding machine 1A includes a magazine 2A that houses the wire W, a wire feeder 3A that feeds the wire W, and a wire guide 4A that guides the wire W to be fed to the wire feeder 3A. Further, the reinforcing bar binding machine 1A includes a curl forming part 5A forming a path for looping the wire W fed by the wire feeder 3A around the reinforcing bars S, and a cutter 6A that cuts the wire W wound on the reinforcing bars S. Further, the reinforcing bar binding machine 1A includes a binding part 7A that twists the wire W wound on the reinforcing bars S, and a driving part 8A that drives the binding part 7A.

The magazine 2A is an example of a housing in which a reel 20 with a long wire W releasably wound thereon is rotatably and detachably housed. For the wire W, a wire made of a plastically deformable metal wire, a wire which is a metal wire coated with resin, or a stranded wire is used. One or a plurality of wires W are wound on a hub portion (not illustrated) of the reel 20, such that one, or simultaneously a plurality of wires W can be pulled out from the reel 20.

The wire feeder 3A includes a pair of feed gears 30 that hold one or a plurality of wires W in parallel therebetween to feed the wire, a feed motor 31 that drives the feed gears 30, and a transmission mechanism 32 for transmitting a rotational movement of the feed motor 31 to the feed gears 30. The feed motor 31 is an example of one driving part, and is mounted to one side surface 10*a*1 that is an example of one side of the main body 10A in a second direction D2, while protruding laterally outward. In the wire feeder 3A, the rotational movement of the feed motor 31 is transmitted via the transmission mechanism 32 to rotate the feed gears 30.

As a result, the wire feeder 3A feeds the wire W held between the pair of feed gears 30 along an extending direction of the wire W. In a configuration in which a plurality of wires W such as, for example, two wires W are fed, the two wires W are fed in parallel.

In the wire feeder 3A, by switching between forward and reverse rotation directions of the feed motor 31, the rotation direction of the feed gear 30 can be switched, and the feeding direction of the wire W is switched between the positive direction which is one direction, and the reverse direction which is the other direction opposite to the one direction.

The wire guide 4A is provided at a predetermined position on the upstream side of the wire feeder 3A with respect to the feeding direction in which the wire W is fed in the positive direction. In a configuration in which two wires W are fed, the wire guide 4A restricts an orientation of the two wires W in a radial direction, arranges the two incoming wires W in parallel, and guides the wires between the pair of feed gears 30.

The wire guide 4A has a shape such that an opening on the downstream side with respect to the feeding direction of the wire W fed in the positive direction restricts the orientation of the wire W in the radial direction. On the other hand, an opening on the upstream side with respect to the feeding direction of the wire W fed in the positive direction has a larger opening area than the opening on the downstream side.

The curl forming part 5A includes a curl guide 50 that forms a winding curl with the wire W fed by the wire feeder 3A, and an inductive guide 51 that guides the wire W formed with the winding curl by the curl guide 50 to the binding part 7A. In the reinforcing bar binding machine 1A, the path of the wire W fed by the wire feeder 3A is restricted by the curl forming part 5A, so that the locus of the wire W forms a loop Ru as illustrated by a two-dot chain line in FIG. 3A, and the wire W is looped around the reinforcing bars S.

The cutter 6A includes a fixed blade 60, a movable blade 61 that cuts the wire W in cooperation with the fixed blade 60, and a transmission mechanism 62 that transmits a movement of the binding part 7A to the movable blade 61. The cutter 6A cuts the wire W by the rotational movement of the movable blade 61 around the fixed blade 60 as a fulcrum axis.

The binding part 7A includes the wire locking body 70 to which the wire W is locked, and a rotating shaft 72 for operating the wire locking body 70. The driving part 8A includes a motor 80, which is an example of the other driving part, and a speed reducer 81 that decreases speed and amplifies torque. In the binding part 7A and the driving part 8A, the rotating shaft 72 and the motor 80 are connected via the speed reducer 81, and the rotating shaft 72 is driven by the motor 80 via the speed reducer 81.

When seen from above, the rotating shaft 72 is provided approximately at a center of the main body 10A, and extends in the front and rear directions as indicated by arrows A1 and A2. In the speed reducer 81, input and output shafts are coaxially positioned according to the configuration used by planetary gears, for example. As a result, the motor 80 is provided coaxially with the rotating shaft 72 at a rear portion of the main body 10A, which is the other side of the rotating shaft 72 along the axial direction.

In the reinforcing bar binding machine 1A, the curl guide 50 and the inductive guide 51 of the curl forming part 5A described above are provided so as to protrude from a front surface 10*a*4 of the main body 10A which is one side along the axial direction of the rotating shaft 72. Further, the reinforcing bar binding machine 1A includes a feed restriction part 90 to be contacted with a leading end of the wire W, on the feeding path of the wire W that is guided by the curl forming part 5A and locked by the wire locking body 70. Further, in the reinforcing bar binding machine 1A, a contacting portion 91 to be contacted with the reinforcing bars S is provided at a front end of the main body 10A between the curl guide 50 and the inductive guide 51.

In the reinforcing bar binding machine 1A, the handle 11A extends downward from the main body 10A. Further, a battery 9A is detachably attached to a lower portion of the handle 11A. Further, in the reinforcing bar binding machine 1A, the magazine 2A is provided in front of the handle 11A. In the reinforcing bar binding machine 1A, the wire feeder 3A, the cutter 6A, the binding part 7A, the driving part 8A for driving the binding part 7A, and the like described above are housed in the main body 10A.

In the reinforcing bar binding machine 1A, a trigger 12A, which is an example of an operation unit, is provided on a front side of the handle 11A, and a switch 13A is provided inside the handle 11A. In the reinforcing bar binding machine 1A, a control unit 14A controls the motor 80 and the feed motor 31 according to the state of the switch 13A pressed by the operation of the trigger 12A.

The reinforcing bar binding machine 1A includes an operation unit 19 that receives operations such as turning on or off power supply, setting a binding strength by wire W, and the like. The operation unit 19 is provided on a rear surface 10*a*3 which is an example of the other side of the main body 10A along the axial direction of the rotating shaft 72, and includes a binding force setting unit 19*a* capable of setting the binding strength by the wire W, a power switch 19*b*, and the like.

The reinforcing bar binding machine 1A includes a fan 15A that generates an air flow passing through the main body 10A, thus cooling the motor 80 and a feed motor 31 that generate heat from driving. Further, the reinforcing bar binding machine 1A includes a mounting portion 15Aa for the fan 15A on the one side surface 10*a*1 of the main body 10A in the second direction D2 intersecting the axial direction of the rotating shaft 72 and the extending direction of the handle 11A. The fan 15A is an example of a blower and is mounted to the mounting portion 15Aa on the one side surface 10*a*1 of the main body 10A while protruding laterally outward. The feed motor 31 is provided in front of the fan 15A, that is, provided on the one side along the axial direction of the rotating shaft 72. That is, the fan 15A is provided behind the feed motor 31. In addition, the fan 15A is provided on a side of the motor 80. As the fan 15A, for example, an axial flow fan, a centrifugal fan, a blower fan, and the like may be used.

In the main body 10A, a position on the mounting portion 15Aa where the fan 15A is mounted is open, and an intake port of the fan 15A and the inside of the main body 10A are connected to each other such that air passes therethrough.

The reinforcing bar binding machine 1A includes, on the one side surface 10*a*1 of the main body 10A, a cover 16A that covers the mounting portion 15Aa. The cover 16A is an example of a convex exterior portion, has a shape that covers the fan 15A, the feed motor 31, the transmission mechanism 32, and one of the feed gears 30 of the wire feeder 3A and the like, which are mounted on the one side surface 10*a*1 of the main body 10A, and has a laterally outwardly protruding shape.

The reinforcing bar binding machine 1A includes a first intake port 17Aa through which external air is sucked into the main body 10A by the air flow generated by the fan 15A. The first intake port 17Aa is configured by providing an opening on a side surface of the main body 10A, such as, for example, at a predetermined position on the other side surface 10*a*2 that is an example of the other side of the main body 10A in the second direction D2. On the other side surface 10*a*2 of the main body 10A, there are provided a convex portion 10*b* at a portion connected to the handle 11A, which is formed into a laterally outwardly protruding shape, and a concave portion 10*c* on a lower side of the convex portion 10*b*, which is recessed inward at a portion of a connected area with the handle 11A. The first intake port 17Aa is provided in the concave portion 10*c* such that the first intake port 17Aa is kept from exposure when the reinforcing bar binding machine 1A is viewed from above.

Further, the reinforcing bar binding machine 1A may include a second intake port 17Ab configured in a gap between the trigger 12A and the main body 10A to suck in air. Since the trigger 12A is a member that can move with respect to the main body 10A, the gap is provided between the trigger 12A and the main body 10A. When the fan 15A generates an air flow passing through the main body 10A, the air is also sucked from such a gap between the trigger 12A and the main body 10A. Therefore, the second intake port 17Ab is configured by the gap between the trigger 12A and the main body 10A. Note that the intake port may be configured by a gap between switches other than the trigger 12A such as, for example, the binding force setting unit 19*a* or the power switch 19*b* provided in the operation unit 19 arranged behind the motor 80 and the main body 10A, and the intake port may be formed by a gap between the main body 10A and a movable member such as a switch and the like that is exposed to the outside from the main body 10A and is movable with respect to the main body 10A.

The reinforcing bar binding machine 1A includes a filter 17*c* in the main body 10A inside the first intake port 17Aa. The filter 17*c* removes dust particles and the like from the air sucked into the main body 10A by the fan 15A and also suppresses the infiltration of foreign substances such as dust particles, dusts, moisture, and the like into the main body 10A.

The reinforcing bar binding machine 1A is provided with an exhaust port 18A on the one side surface 10*a*1 of the main body 10A that is a side surface opposite to the other side surface 10*a*2 provided with the first intake port 17Aa, by providing a downwardly-facing opening along the extending direction of the handle 11A. The exhaust port 18A is configured by providing the opening in a lower surface of a portion facing the fan 15A in the cover 16A having a laterally outwardly protruding shape. Further, the reinforcing bar binding machine 1A includes a filter 18*a* inside the exhaust port 18A. The filter 18*a* suppresses the infiltration of foreign substances such as dust particles, dusts, moisture, and the like into the main body 10A. The fan 15A may be provided on the other side surface 10*a*2 side of the main body 10A in the second direction D2. In this case, it is preferable that the first intake port 17Aa is provided on the one side surface 10*a*1 of the main body 10A, and the exhaust port 18A is provided on the same side as the fan 15A, that is, on the other side surface 10*a*2 of the main body 10A.

Figure 4A:
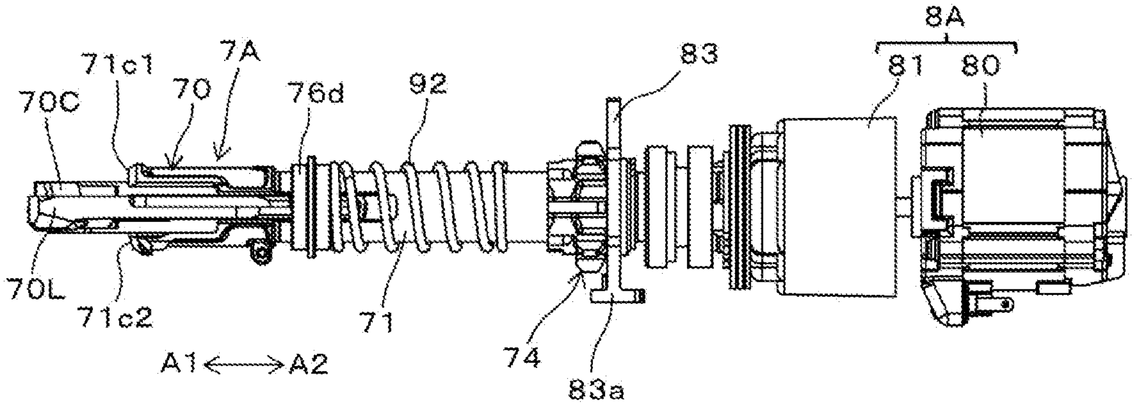
FIG. 4A is a side view illustrating the configuration of the main part of the reinforcing bar binding machine according to the first embodiment.
Figure 4B:
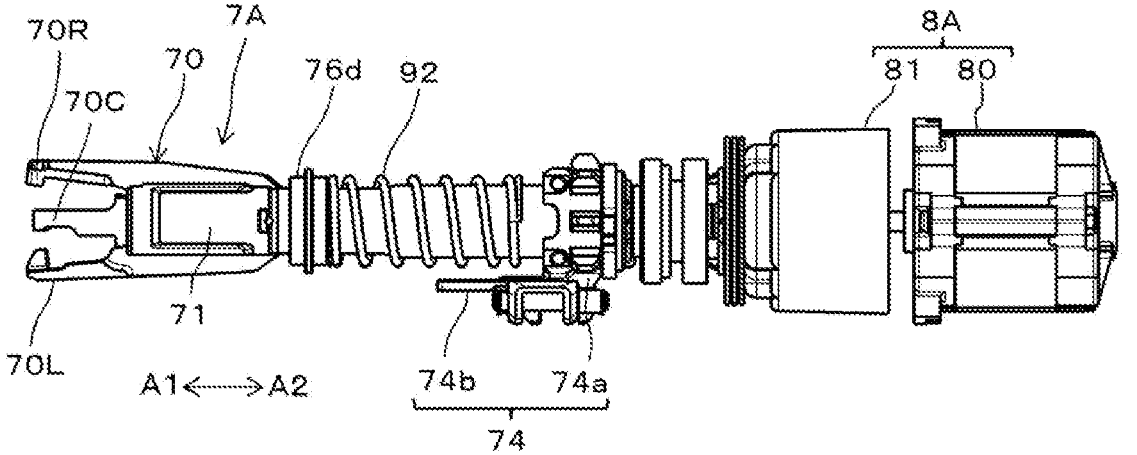
FIG. 4B is a top view illustrating the configuration of the main part of the reinforcing bar binding machine according to the first embodiment.
Figure 4C:
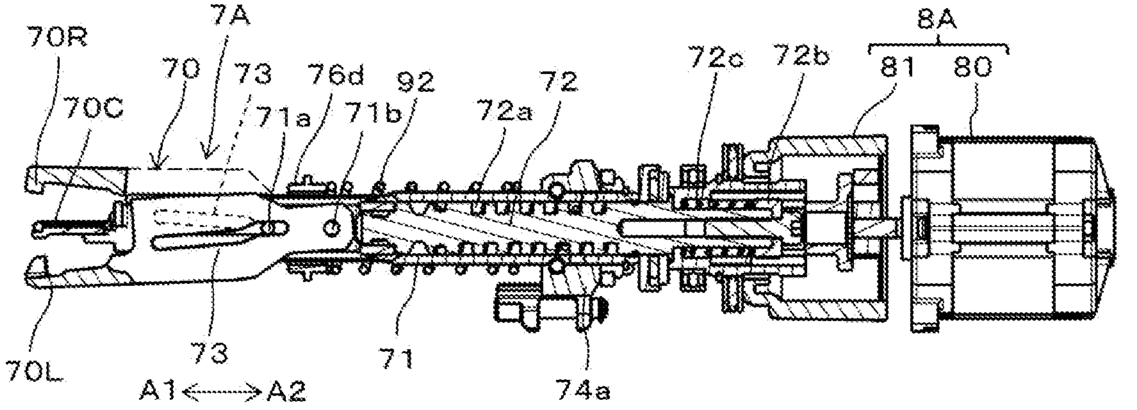
FIG. 4C is a top sectional view illustrating the configuration of the main part of the reinforcing bar binding machine according to the first embodiment.

FIG. 4A is a side view illustrating the configuration of the main part of the reinforcing bar binding machine according to the embodiment, FIG. 4B is a top view illustrating the configuration of the main part of the reinforcing bar binding machine according to the embodiment, and FIG. 4C is a top sectional view illustrating the configuration of the main part of the reinforcing bar binding machine according to the embodiment. Then, the details of the binding part 7A and the connecting structure of the binding part 7A and the driving part 8A will be described with reference to each drawing.

As described above, the binding part 7A includes the wire locking body 70 to which the wire W is locked, and a rotating shaft 72 for operating the wire locking body 70. In the binding part 7A and the driving part 8A, the rotating shaft 72 and the motor 80 are connected via the speed reducer 81, and the rotating shaft 72 is driven by the motor 80 via the speed reducer 81.

The wire locking body 70 includes a center hook 70C connected to the rotating shaft 72, a first side hook 70L and a second side hook 70R that are opened and closed with respect to the center hook 70C, and a sleeve 71 that operates the first side hook 70L and the second side hook 70R in conjunction with the rotational movement of the rotating shaft 72.

The binding part 7A may be divided into a front side where the center hook 70C, the first side hook 70L, and the second side hook 70R are provided, and a rear side where the rotating shaft 72 is connected to the speed reducer 81.

The center hook 70C is connected to the front end, which is one end of the rotating shaft 72, via a configuration that enables rotation with respect to the rotating shaft 72 and also enables movement in the axial direction integrally with the rotating shaft 72.

The leading end side of the first side hook 70L, which is one end along the axial direction of the rotating shaft 72, is positioned on one side with respect to the center hook 70C. Further, the rear end side of the first side hook 70L, which is the other end along the axial direction of the rotating shaft 72, is rotatably supported by the center hook 70C by a shaft 71*b*.

The leading end side of the second side hook 70R, which is one end along the axial direction of the rotating shaft 72, is positioned on the other side with respect to the center hook 70C. Further, the rear end side of the second side hook 70R, which is the other end along the axial direction of the rotating shaft 72, is rotatably supported by the center hook 70C by the shaft 71*b*.

As a result, the wire locking body 70 is opened and closed in a direction in which the leading end side of the first side hook 70L separates away from and approaches the center hook 70C by the rotational movement about the shaft 71*b* as the fulcrum. Further, the leading end side of the second side hook 70R is opened and closed in a direction in which the leading end side separates away from and approaches the center hook 70C.

The rotating shaft 72 is connected to the speed reducer 81 at a rear end, which is the other end, via a connecting part 72*b* having a configuration that is integrally rotatable with the speed reducer 81 and is also movable in the axial direction with respect to the speed reducer 81. The connecting part 72*b* includes a spring 72*c* that biases the rotating shaft 72 rearward, which is a direction of approaching the speed reducer 81, and restricts the position of the rotating shaft 72 along the axial direction. As a result, the rotating shaft 72 is configured such that, by the force pushing rearward applied by the spring 72*c*, the rotating shaft 72 is movable forward, that is, movable in a direction of separating away from the speed reducer 81. Therefore, upon application of the force that moves the wire locking body 70 forward along the axial direction, the rotating shaft 72 is movable forward by the force pushing rearward applied by the spring 72*c*.

The sleeve 71 is shaped such that a range of a predetermined length from the end at the forward direction indicated by an arrow A1 along the axial direction of the rotating shaft 72 is divided into two parts in the radial direction, receiving therein the first side hook 70L and the second side hook 70R in openable and closable manner. Further, the sleeve 71 has a cylindrical shape that covers the circumference of the rotating shaft 72, and includes a convex portion (not illustrated) protruding from an inner peripheral surface of a tubular space where the rotating shaft 72 is inserted, in which the convex portion enters a groove portion of a feed screw 72*a* formed along the axial direction on the outer periphery of the rotating shaft 72. When the rotating shaft 72 is rotated, the sleeve 71 is moved in the forward and rearward direction, which is a direction along the axial direction of the rotating shaft 72, according to the rotation direction of the rotating shaft 72 by the action of the convex portion (not illustrated) and the feed screw 72*a* of the rotating shaft 72. Further, the sleeve 71 is rotated integrally with the rotating shaft 72.

The sleeve 71 includes an opening and closing pin 71*a* for opening and closing the first side hook 70L and the second side hook 70R.

The opening and closing pin 71*a* is inserted into an opening and closing guide hole 73 provided in the first side hook 70L and the second side hook 70R. The opening and closing guide hole 73 extends along a moving direction of the sleeve 71, and has a shape that converts the linear movement of the opening and closing pin 71*a* that is moved in conjunction with the sleeve 71 into an opening and closing movement by the rotation of the first side hook 70L and the second side hook 70R about the shaft 71*b* as a fulcrum.

In the wire locking body 70, as the sleeve 71 is moved in the rearward direction as indicated by an arrow A2, by the locus of the opening and closing pin 71*a* and the shape of the opening and closing guide hole 73, the first side hook 70L and the second side hook 70R are moved in the direction of separating away from the center hook 70C by the rotational movement about the shaft 71*b* as a fulcrum.

As a result, the first side hook 70L and the second side hook 70R are opened with respect to the center hook 70C, and the feeding path for the wire W to pass through is formed between the first side hook 70L and the center hook 70C, and between the second side hook 70R and the center hook 70C.

When the first side hook 70L and the second side hook are opened with respect to the center hook 70C, the wire W fed by the wire feeder 3A is passed between the center hook 70C and the first side hook 70L. The wire W passed between the center hook 70C and the first side hook 70L is guided to the curl forming part 5A. Then, the wire W formed with the winding curl by the curl forming part 5A and guided to the binding part 7A is passed between the center hook 70C and the second side hook 70R.

In the wire locking body 70, as the sleeve 71 is moved in the forward direction as indicated by the arrow A1, by the locus of the opening and closing pin 71*a* and the shape of the opening and closing guide hole 73, the first side hook 70L and the second side hook 70R are moved in a direction of approaching the center hook 70C by the rotational movement about the shaft 71*b* as a fulcrum. As a result, the first side hook 70L and the second side hook 70R are closed with respect to the center hook 70C.

When the first side hook 70L is closed with respect to the center hook 70C, the wire W held between the first side hook 70L and the center hook 70C is locked in a movable form between the first side hook 70L and the center hook 70C. Further, when the second side hook 70R is closed with respect to the center hook 70C, the wire W held between the second side hook 70R and the center hook 70C is locked in such a form that the wire W does not come off from between the second side hook 70R and the center hook 70C.

The wire locking body 70 includes a bending part 71*cl* that pushes the leading end side, which is one end of the wire W, in a predetermined direction and bends the wire W to form the wire W into a predetermined shape. The wire locking body 70 includes a bending part 71*c*2 that pushes an end side, which is the other end of the wire W cut by the cutter 6A, in a predetermined direction and bends the wire W to form the wire W into a predetermined shape.

The sleeve 71 has such a shape that the end at the forward direction as indicated by the arrow A1 is divided into two parts of the first side hook 70L and the second side hook 70R with the center hook 70C held therebetween, and includes the bending part 71*cl* formed at the front end at a position on an upper side in the non-rotating region, and the bending part 71*c*2 formed at the front end at a position on a lower side.

After the wire W is cut by the cutter 6A, the sleeve 71 is moved in the forward direction as indicated by the arrow A1 so that the leading end side of the wire W locked by the center hook 70C and the second side hook 70R is pushed by the bending part 71*cl* and bent toward the reinforcing bars S side. Further, the sleeve 71 is locked by the center hook 70C and the first side hook 70L, and the end side of the wire W cut by the cutter 6A is pushed by the bending part 71*c*2 and bent toward the reinforcing bars S side.

The binding part 7A includes a rotation restriction part 74 that restricts the rotation of the wire locking body 70 and the sleeve 71 that are rotated in conjunction with the rotational movement of the rotating shaft 72. The rotation restriction part 74 is provided with a rotation restriction blade 74*a* on the sleeve 71 and is provided with a rotation restriction claw 74*b* on the main body 10A.

The rotation restriction blade 74*a* is configured by providing a plurality of convex portions radially protruding from the outer periphery of the sleeve 71 at predetermined intervals in the circumferential direction of the sleeve 71. The rotation restriction blade 74*a* is fixed to the sleeve 71 and is moved and rotated integrally with the sleeve 71.

The rotation restriction part 74 locks the wire W with the wire locking body 70, winds the wire W on the reinforcing bars S, and then cuts the wire W with the cutter 6A, and further, the rotation restriction blade 74*a* is locked to the rotation restriction claw 74*b* in the operating range in which the wire W is bent and formed by the bending parts 71*cl* and 71*c*2 of the sleeve 71. When the rotation restriction blade 74*a* is locked with the rotation restriction claw 74*b*, the rotation of the sleeve 71 in conjunction with the rotation of the rotating shaft 72 is restricted, and the sleeve 71 is moved in the forward and rearward direction by the rotational movement of the rotating shaft 72.

Further, in the operating range in which the wire W locked by the wire locking body 70 is twisted, in the rotation restriction part 74, the rotation restriction blade 74*a* is released from being locked with the rotation restriction claw 74*b*. When the rotation restriction blade 74*a* is released from being locked with the rotation restriction claw 74*b*, the sleeve 71 is rotated in conjunction with the rotation of the rotating shaft 72. In the wire locking body 70, the center hook 70C, the first side hook 70L, and the second side hook 70R that lock the wire W are rotated in conjunction with the rotation of the sleeve 71. In the operating range of the sleeve

71 and the wire locking body 70 along the axial direction of the rotating shaft 72, the operating range in which the wire W is locked by the wire locking body 70 is referred to as a first operating range. Further, the operating range for twisting the wire W locked by the wire locking body 70 in the first operating range is referred to as a second operating range.

The binding part 7A is provided such that a moving member 83 is movable in conjunction with the sleeve 71. The moving member 83 is rotatably attached to the sleeve 71, is not in conjunction with the rotation of the sleeve 71, and is moved in the forward and rearward direction in conjunction with the sleeve 71.

The moving member 83 includes an engagement part 83*a* that engages with the transmission mechanism 62. In the binding part 7A, when the moving member 83 is moved in the forward and rearward direction in conjunction with the sleeve 71, the transmission mechanism 62 transmits the movement of the moving member 83 to the movable blade 61 to rotate the movable blade 61. As a result, the movable blade 61 is rotated in a predetermined direction by the movement of the sleeve 71 moving in the forward direction, and the wire W is cut.

The binding part 7A includes a tension applying spring 92 so that binding can be performed while tension is applied on the wire W. The tension applying spring 92 is provided outside the sleeve 71, and biases the sleeve 71 and the wire locking body 70 in the direction of separating away from the contacting portion 91 along the axial direction of the rotating shaft 72. The tension applying spring 92 is formed of, for example, a coil spring that expands and contracts in the axial direction, and is fitted on the outer periphery of the sleeve 71 between the rotation restriction blade 74*a* and a support frame 76*d* that rotatably and axially slidably supports the sleeve 71.

The tension applying spring 92 is compressed between the support frame 76*d* and the rotation restriction blade 74*a* according to the position of the sleeve 71 along the axial direction of the rotating shaft 72, and biases the sleeve 71 rearward, which is the direction of separating away from the contacting portion 91 along the axial direction of the rotating shaft 72. As a result, the tension applying spring 92 biases the wire locking body 70 provided with the sleeve 71 in the direction of maintaining the tension applied to the wire W with the movement of feeding the wire W in the reverse direction and winding the wire W on the reinforcing bar S.

As a result, when the sleeve 71 is moved forward and compressed, the tension applying spring 92 applies tension to the wire W that is cut by the cutter 6A after wound on the reinforcing bar S with a larger force than the force applied in the direction in which the wire W wound on the reinforcing bars S loosens. Therefore, it is possible to bind the wire W after cutting while applying tension thereto.

Further, the wire locking body 70 is configured to be movable forward as the sleeve 71 is applied with the force pushing rearward by the tension applying spring 92 and also as the rotating shaft 72 is applied with the force pushing rearward by the spring 72*c*.

Operation Example of Reinforcing Bar Binding Machine According to Embodiment The operation of binding the reinforcing bars S with the wire W by a reinforcing bar binding machine 1A according to an embodiment will be described below with reference to each drawing. For example, for the mode of operating the reinforcing bar binding machine 1A, there are mode in which the reinforcing bar binding machine 1A is used facing downward, and a mode in which the reinforcing bar binding machine 1A is used facing sideways. In the present embodiment, when it is described that the reinforcing bar binding machine 1A is used facing downward, it means that, when the object to be bound is on a floor surface side, the binding work is performed with the handle 11A facing sideways, and with the curl forming part 5A side on the one side in the axial direction of the rotating shaft 72 facing downward. Further, when it is said that the reinforcing bar binding machine 1A is used facing sideways, it means that, when the object to be bound is on the wall surface side, the binding work is performed with the handle 11A facing downward and with the curl forming part 5A side on the one side in the axial direction of the rotating shaft 72 facing sideways.

When the reinforcing bars S are inserted between the curl guide 50 and the inductive guide 51 of the curl forming part 5A, and the trigger 12A is operated, the feed motor 31 is driven in the forward rotation direction, and the wire W is fed by the wire feeder 3A in the positive direction as indicated by the arrow F.

In the case of a configuration in which the reinforcing bars S are bound with a plurality of wires W, such as two wires W for example, the two wires W are fed in parallel along the axial direction of the loop Ru formed by these wires W by the wire guide 4A.

The wires W fed in the positive direction are passed between the center hook 70C and the first side hook 70L and are fed to the curl guide 50 of the curl forming part 5A. By passing through the curl guide 50, the wire W is formed with a winding curl that is looped around the reinforcing bars S.

The wire W formed with the winding curl by the curl guide 50 is guided to the inductive guide 51 and further fed by the wire feeder 3A in the positive direction, and guided between the center hook 70C and the second side hook 70R by the inductive guide 51. Then, the wire W is fed until the leading end thereof is brought into contact with the feed restriction part 90. When the wire W is fed to a position where the leading end thereof is brought into contact with the feed restriction part 90, driving of the feed motor 31 is stopped.

After stopping feeding the wire W in the positive direction, the motor 80 is driven in the forward rotation direction. In the sleeve 71, in the first operating range in which the wire W is locked by the wire locking body 70, the rotation restriction blade 74*a* is locked to the rotation restriction claw 74*b*, so that the rotation of the sleeve 71 in conjunction with the rotation of the rotating shaft 72 is restricted. As a result, the rotation of the motor 80 is converted into linear movement, and the sleeve 71 is moved in the direction of the arrow A1 which is the forward direction.

When the sleeve 71 is moved in the forward direction, the opening and closing pin 71*a* is passed through the opening and closing guide hole 73. As a result, the first side hook 70L is moved in a direction of approaching the center hook 70C by the rotational movement about the shaft 71*b* as the fulcrum. When the first side hook 70L is closed with respect to the center hook 70C, the wire W held between the first side hook 70L and the center hook 70C is locked in a movable form between the first side hook 70L and the center hook 70C.

Further, the second side hook 70R is moved in the direction of approaching the center hook 70C by the rotational movement about the shaft 71*b* as a fulcrum. When the second side hook 70R is closed with respect to the center hook 70C, the wire W held between the second side hook 70R and the center hook 70C is locked in such a form that the wire W does not come off from between the second side hook 70R and the center hook 70C.

After advancing the sleeve 71 to the position where the wire W is locked by the movement of closing the first side hook 70L and the second side hook 70R, the rotation of the motor 80 is temporarily stopped, and the feed motor 31 is driven in the reverse rotation direction.

As a result, the pair of feed gears 30 are reversed, and the wire W held between the pair of feed gears 30 is fed in the opposite direction as indicated by the arrow R. Since the leading end side of the wire W is locked in a form so as not to come off between the second side hook 70R and the center hook 70C, the wire W is wound on the reinforcing bars S by the movement of feeding the wire W in the opposite direction.

After winding the wire W on the reinforcing bars S and stopping driving the feed motor 31 in the reverse rotation direction, by driving the motor 80 in the forward rotation direction, the sleeve 71 is further moved in the forward direction as indicated by the arrow A1.

The movement of the sleeve 71 in the forward direction is transmitted to the cutter 6A by the transmission mechanism 62, so that the movable blade 61 is rotated and the wire W locked by the first side hook 70L and the center hook 70C is cut by the operation of the fixed blade 60 and the movable blade 61.

When the wire W is cut, the tension applied to the wire W is released so that the sleeve 71 tends to move in the forward direction. When the sleeve 71 is moved in the forward direction, the force for pulling the wire W locked by the wire locking body 70 rearward is decreased, and the wire W wound on the reinforcing bars S loosens before being twisted.

On the other hand, with the reinforcing bar binding machine 1A according to the present embodiment, in the operating range in which the sleeve 71 and the wire locking body 70 are moved in the forward direction to cut the wire W, the rotation restriction blade 74*a* comes into contact with the tension applying spring 92, and the tension applying spring 92 is compressed between the support frame 76*d* and the rotation restriction blade 74*a*, so that the sleeve 71 and the wire locking body 70 are biased rearward by the tension applying spring 92.

As a result, by suppressing the forward movement of the sleeve 71, the decrease in the force that pulls the wire W locked by the wire locking body 70 rearward is suppressed, thereby suppressing the loosening of the wire W wound on the reinforcing bars S before twisting.

By driving the motor 80 in the forward rotation direction, the sleeve 71 is moved in the forward direction as indicated by the arrow A1, and almost simultaneously with cutting the wire W, the bending part 71*cl* is moved in the direction of approaching the reinforcing bars S. As a result, the leading end side of the wire W locked by the center hook 70C and the second side hook 70R is pressed toward the reinforcing bars S side by the bending part 71*cl* and bent toward the reinforcing bars S side about the locking position as a fulcrum. By further moving the sleeve 71 forward, the wire W locked between the second side hook 70R and the center hook 70C is held in a state of being held by the bending part 71*cl*.

Further, the wire W is held between the first wire holding part 71*c*2*a* and the second wire holding part 71*c*2*b* forming the bending part 71*c*2 of the sleeve 71 and the come-off prevention part 70La of the first side hook 70L, and the end side of the wire W cut by the cutter 6A is further pressed toward the reinforcing bar S side by the bending part 71*c*2, and bent toward the reinforcing bar S side about the locking position as a fulcrum. By further moving the sleeve 71 forward, the wire W locked between the first side hook 70L and the center hook is held in a state of being held between the bending part 71*c*2.

After bending the leading end side and the end side of the wire W toward the reinforcing bars S side, the motor 80 is further driven in the forward rotation direction, so that the sleeve 71 is moved further forward. When the sleeve 71 is moved to a predetermined position and reaches the operating range where the wire W locked by the wire locking body 70 is twisted, the rotation restriction blade 74*a* is released from being locked with the rotation restriction claw 74*b*.

As a result, by further driving the motor 80 in the forward rotation direction, the sleeve 71 is rotated in conjunction with the rotating shaft 72, and the wire W locked by the wire locking body 70 is twisted.

In the binding part 7A, in the second operating range in which the sleeve 71 is rotated and twists the wire W, as the wire W locked by the wire locking body 70 is twisted, the wire locking body 70 is subjected to a force that pulls forward along the axial direction of the rotating shaft 72. Meanwhile, moving the sleeve 71 forward to a position where the sleeve 71 is rotatable causes the tension applying spring 92 to be further compressed, and the sleeve 71 receives the force pushing rearward applied by the tension applying spring 92.

As a result, when the force that moves the wire locking body 70 and the rotating shaft 72 forward along the axial direction is applied to the wire locking body 70, the sleeve 71 receives the force pushing rearward applied by the tension applying spring 92, and also, the rotating shaft 72 is moved forward while receiving the force pushing rearward applied by the spring 72*c*, and twists the wire W while being moved forward.

Therefore, as the portion of the wire W locked by the wire locking body 70 is pulled rearward and the tension is applied in the tangential direction of the reinforcing bars S, the wire W is pulled so as to be in close contact with the reinforcing bars S. In the binding part 7A, in a second operating range in which the sleeve 71 is rotated and twists the wire W, when the wire locking body 70 is further rotated in conjunction with the rotating shaft 72, the wire locking body 70 and the rotating shaft 72 are moved in the forward direction which is the direction of decreasing a gap between the twisted portion of the wire W and the reinforcing bars S, resulting in the wire W being further twisted.

Therefore, the wire W is twisted as the wire locking body 70 and the rotating shaft 72 are moved forward while receiving the force pushing rearward applied by the tension applying spring 92 and the spring 72*c*, so that the gap between the twisted portion of the wire W and the reinforcing bars S is decreased, and the wire W comes into close contact with the reinforcing bars S and in a form that conforms to the reinforcing bars S. As a result, the loosening of the wire W before twisting can be removed, and the wire W can be bound in a state of being in close contact with the reinforcing bars S.

When it is detected that the load applied to the motor 80 is maximized by twisting the wire W, the forward rotation of the motor 80 is stopped. Then, by driving the motor 80 in the reverse rotation direction, the rotating shaft 72 is rotated in the reverse direction, and the sleeve 71 is rotated in the reverse direction following the reverse rotation of the rotating shaft 72, such that the rotation restriction blade 74*a* is locked with the rotation restriction claw 74*b*, thus restricting the rotation of the sleeve 71 in conjunction with the rotation of the rotating shaft 72. As a result, the sleeve 71 is moved in the direction of the arrow A2 which is the rearward direction.

When the sleeve 71 is moved in the rearward direction, the bending parts 71*cl* and 71*c*2 are separated from the wire W, and the wire W held by the bending parts 71*cl* and 71*c*2 is released. Further, when the sleeve 71 is moved in the rearward direction, the opening and closing pin 71*a* is passed through the opening and closing guide hole 73. As a result, the first side hook 70L is moved in a direction of separating away from the center hook 70C by the rotational movement about the shaft 71*b* as a fulcrum. Further, the second side hook 70R is moved in a direction of separating away from the center hook 70C by the rotational movement about the shaft 71*b* as a fulcrum. As a result, the wire W comes off from the wire locking body 70.

In the reinforcing bar binding machine 1A, the temperature of the motor 80 rises due to the motor 80 driving for the operation of twisting the wire W, or the like. Further, the temperature of the feed motor 31 rises due to the feed motor 31 driving for the operation of feeding the wire W.

On the other hand, in the reinforcing bar binding machine 1A, the fan 15A is driven so that the air is sucked into the main body 10A from the first intake port 17Aa provided on the other side surface 10*a*2 of the main body 10A, and the air sucked from the first intake port 17Aa is passed through the main body 10A and exhausted from the exhaust port 18A provided on the one side surface 10*a*1 of the main body 10A. An air is also sucked into the main body 10A from the second intake port 17Ab formed by the gap between the movable member such as the trigger 12A and the like and the main body 10A.

As a result, air is flowed into the main body 10A from the outside, and the air with increased temperature in the main body 10A is exhausted to the outside, so that the temperature rise in the main body 10A can be suppressed. Therefore, it is possible to suppress the temperature rise of the motor 80 and the feed motor 31. In particular, in the vicinity of the position where the motor 80 is provided in the main body 10A, the first intake port 17Aa is provided on the other side surface 10*a*2 of the main body 10A, and the exhaust port 18A is provided on the one side surface 10*al*, thus facilitating the generation of air flow CA around the motor 80 as indicated by the alternate long and short dash line in FIG. 1B, and enhancing the effect of suppressing the temperature rise of the motor 80.

In the electric power tool such as a binding machine and the like with a handle and a motor provided at the rear portion of the main body, the configuration in which a fan is provided in the rear portion of the main body is known. In that configuration, the length of the main body in the front and rear directions is increased, causing a difference in feeling of use compared to the configuration without a fan. Further, when the exhaust port is positioned at the rear portion of the main body, the exhaust port faces upward when the electric power tool is used facing downward. Accordingly, dust, moisture, and the like are likely to enter from the exhaust port.

On the other hand, the reinforcing bar binding machine 1A is provided with the feed motor 31 protruding from the one side surface 10*a*1 of the main body 10A, configuring a protruding portion on the one side surface 10*a*1 of the main body 10A. Therefore, the presence of the fan 15A provided on the one side surface 10*a*1 of the main body 10A would not make a difference in feeling of use.

Further, the reinforcing bar binding machine 1A is provided with the exhaust port 18A on the one side surface 10*a*1 of the main body 10A, by providing the opening facing in the extending direction of the handle 11A, such that, when the reinforcing bar binding machine 1A is used facing sideways, the exhaust port 18A faces downward, and when the reinforcing bar binding machine 1A is used facing downward, the exhaust port 18A faces sideways. As a result, it is possible to prevent dusts, moisture, and the like from entering through the exhaust port 18A. Further, the reinforcing bar binding machine 1A is provided with the concave portion 10*c* on the other side surface 10*a*2 of the main body 10A and the first intake port 17Aa provided therein, so that when the reinforcing bar binding machine 1A is used facing sideways, the first intake port 17*a* is not exposed upward when the reinforcing bar binding machine 1A is viewed from above, and when the reinforcing bar binding machine 1A is used facing downward, the first intake port 17Aa faces sideways. As a result, it is possible to prevent dusts, moisture, and the like from entering through the first intake port 17Aa.

Second Embodiment

In the second embodiment, a fan 15B is provided above the motor 80, which is different from the first embodiment in which the fan 15A is provided on the side of the motor 80. A reinforcing bar binding machine 1B of the second embodiment will be described below, and the duplicate description of the configurations and operations common to the reinforcing bar binding machine 1A of the first embodiment will be omitted by quoting the description of the first embodiment.

Figure 5A:
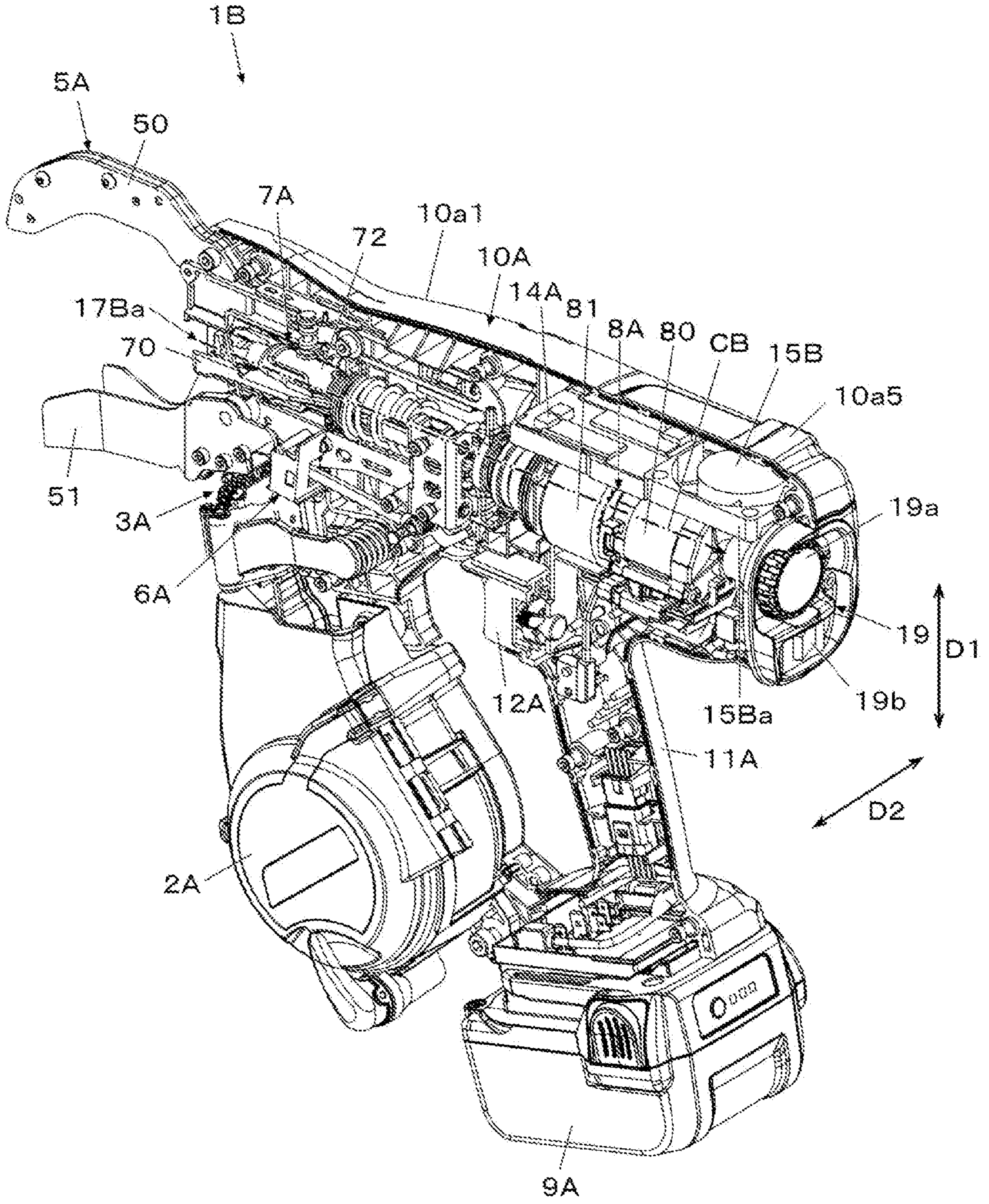
FIG. 5A is an internal configuration diagram, seen from the other side, illustrating an example of an overall configuration of a reinforcing bar binding machine according to a second embodiment.
Figure 5B:
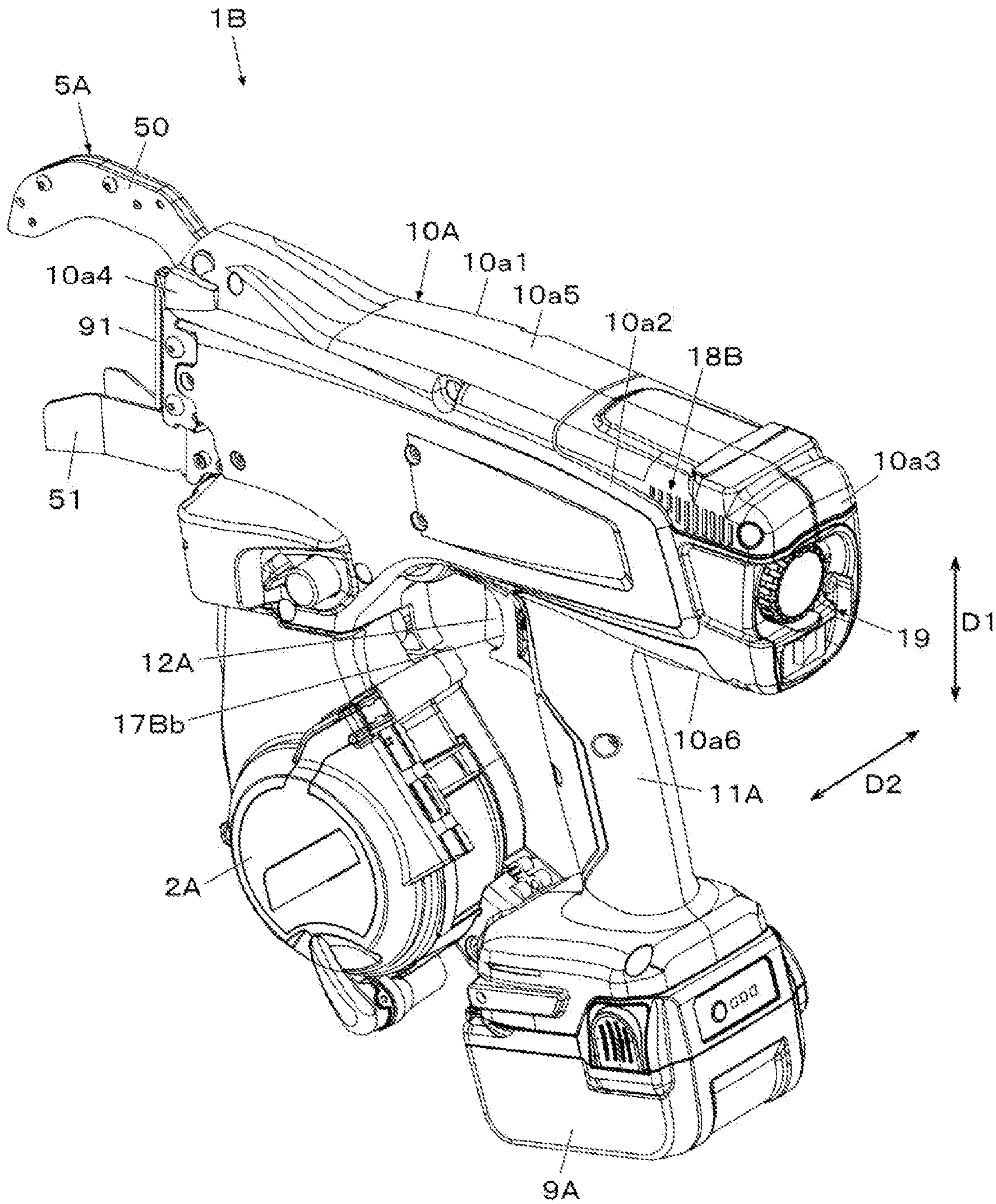
FIG. 5B is an external perspective view, seen from the other side, illustrating an example of the overall configuration of the reinforcing bar binding machine according to the second embodiment.

FIG. 5A is an internal configuration diagram, seen from the other side, illustrating an example of an overall configuration of the reinforcing bar binding machine according to the second embodiment. FIG. 5B is an external perspective view, seen from the other side, illustrating an example of the overall configuration of the reinforcing bar binding machine according to the second embodiment.

As illustrated in FIGS. 5A and 5B, in addition to the configurations of the wire feeder 3A, the curl forming part 5A, the cutter 6A, the binding part 7A, the main body 10A, the handle 11A, and the like described above, the reinforcing bar binding machine 1B includes the fan 15B as an example of the blower, a first intake port 17Ba, a second intake port 17Bb, and an exhaust port 18B. Further, the main body 10A includes the one side surface 10*a*1 and the other side surface 10*a*2, respectively, in the second direction D2 intersecting the axial direction of the rotating shaft 72 and the extending direction of the handle 11A.

The fan 15B generates an air flow passing through the main body 10A, thus cooling the motor 80 and the feed motor 31 that generate heat from driving. The fan 15B is provided on an upper surface 10*a*5 side which is an example of the other side of the main body 10A in the first direction D1, and above the periphery of the motor 80. More specifically, the fan 15B is disposed in a space surrounded by the upper surface of the motor 80, the rear surface of the control unit 14A, and the upper and rear surfaces of the housing forming the main body 10A. In addition, the fan 15B may be disposed between the control unit 14A and the upper surface 10*a*5 of the main body 10A, between the control unit 14A and the motor 80, and between the control unit 14A and the one side surface 10*a*1 or the other side surface 10*a*2 of the main body 10A. As the fan 15B, for example, an axial flow fan, a centrifugal fan, a blower fan, and the like may be used. The fan 15B is mounted to a mounting portion 15Ba fixed at a predetermined position of the main body 10A. An opening (not illustrated) is formed in the mounting portion 15Ba at a position where the fan 15B is mounted, and the intake port of the fan 15B and the inside of the main body 10A communicate with each other through this opening.

The first intake port 17Ba sucks external air into the main body 10A by the air flow generated by the fan 15B. The first intake port 17Ba is provided on the front surface 10*a*4 side of the main body 10A, and between a base end of the curl guide 50 that is a first guide and a base end of the inductive guide 51 that is a second guide. For example, the first intake port 17Ba can be formed by a gap between the wire locking body 70 and the housing of the main body 10A, a gap between the wire locking body 70 and the curl forming part 5A, and the like.

The second intake port 17Bb is provided in the gap between the trigger 12A and the main body 10A, and sucks external air into the main body 10A by the air flow generated by the fan 15B. Further, the second intake port 17Bb may be formed by a gap between switches other than the trigger 12A, such as, for example, the binding force setting unit 19*a* or the power switch 19*b* provided in the operation unit 19 disposed behind the motor 80 and the main body 10A.

The exhaust port 18B exhausts the air sucked into the main body 10A from the first intake port 17Ba or the like to the outside. The exhaust port 18B is provided on the other side surface 10*a*2 side which is an example of the other side of the main body 10A in the second direction D2 intersecting the axial direction of the rotating shaft 72 and the extending direction of the handle 11A. Specifically, the exhaust port 18B is formed on the other side surface 10*a*2 of the main body 10A in the vicinity of the motor 80 and at a position facing the other side portion of the motor 80. Further, the exhaust port 18B is formed of a plurality of openings penetrating the housing of the main body 10A in the thickness direction, and these openings are formed side by side so as to face sideways and also in the front and rear directions of the other side surface 10*a*2 of the main body 10A. The exhaust port 18B may be formed with a single opening. Further, the exhaust port 18B may be provided on the one side surface 10*a*1 opposite to the other side surface 10*a*2 in the main body 10A.

In the second embodiment, a configuration is provided, in which the first intake port 17Ba is provided on the front side of the main body 10A, the exhaust port 18B is provided on the rear side of the main body 10A, and the feed motor 31 and the motor 80 are disposed between the first intake port 17Ba and the exhaust port 18B.

When the fan 15B is driven in the reinforcing bar binding machine 1B, air is sucked into the main body 10A from the first intake port 17Ba formed on the front surface 10*a*4 side of the main body 10A, and the second intake port 17Bb formed by the gap between the trigger 12A and the main body 10A. The air sucked from the first intake port 17Ba and the like flows along the rotating shaft 72 from the front side toward the rear side in the main body 10A by the air suctioning by the driving of the fan 15B, and passes above, below and to the left and right sides of the periphery of the feed motor 31 and the motor 80. In the second embodiment, as illustrated by the alternate long and short dash line in FIG. 5A, an air flow (air passage) CB from the front side toward the rear side is formed in the main body 10A. The air at the periphery of the motor 80 is sucked by the fan 15B. The sucked air is changed in its flow direction by the fan 15B from the axial direction to the lateral direction orthogonal to the axial direction, and exhausted to the outside from the exhaust port 18B provided on the other side surface 10*a*2 of the main body 10A.

With the reinforcing bar binding machine 1B according to the second embodiment, external air is introduced into the main body 10A from the first intake port 17Ba, and the air with increased temperature inside the main body 10A is exhausted to the outside from the exhaust port 18B, so that it is possible to suppress the temperature rise in the main body 10A. Therefore, it is possible to suppress the temperature rise of the motor 80 and the feed motor 31. In particular, in the main body 10A, by providing the exhaust port 18B on the side of the motor 80 and the fan 15B, when the fan 15B that blows out the sucked air to the lateral direction is used, the air sucked from the first intake port 17Ba in the axial direction can be changed in its flow direction to the lateral direction, so that it is possible to efficiently exhaust the air through the exhaust port 18B provided on the side, and enhance the effect of suppressing the temperature rise of the motor 80.

Further, the reinforcing bar binding machine 1B is provided with the exhaust port 18B on the other side surface 10*a*2 of the main body 10A rather than the rear surface 10*a*3 side of the main body 10A, so that when the reinforcing bar binding machine 1B is used facing sideways, the exhaust port 18B faces sideways (lateral direction), and also when the reinforcing bar binding machine 1B is used facing downward, the exhaust port 18B faces sideways. As a result, it is possible to prevent dusts, moisture, and the like from entering through the exhaust port 18B. Further, the reinforcing bar binding machine 1B is provided with the first intake port 17Ba on the front surface 10*a*4 side of the main body 10A, so that when the reinforcing bar binding machine 1B is used facing sideways, the first intake port 17Ba is not exposed upward when the reinforcing bar binding machine 1B is viewed from above, and when the reinforcing bar binding machine 1B is used facing downward, the first intake port 17Ba faces downward. As a result, it is also possible to prevent dusts, moisture, and the like from entering through the first intake port 17Ba.

Further, according to the second embodiment, since the feed motor 31 and the motor 80 are respectively disposed in the air flow CB between the first intake port 17Ba and the exhaust port 18B, both the feed motor 31 and the motor 80 can be efficiently cooled by the air flow CB.

Further, in the second embodiment, since the exhaust port 18B is not provided on the lower surface 10*a*6 side of the main body 10A, it is possible to prevent the air exhausted from the exhaust port 18B from coming into contact with the user's hand when the user grips the handle 11A and performs the work. As a result, even when the binding work is performed in a hot season such as summer, for example, it is possible to prevent the user from feeling uncomfortable as the air increased in temperature by the driving of the motor 80 or the like comes into contact with the user's hand, and prevent a decrease in work efficiency.

Third Embodiment

In the third embodiment, a fan 15C is provided below the motor 80, which is different from the first embodiment in which the fan 15A is provided on the side of the motor 80. A reinforcing bar binding machine 1C of the third embodiment will be described below, and the duplicate description of the configurations and operations common to the reinforcing bar binding machine 1A of the first embodiment will be omitted by quoting the description of the first embodiment.

Figure 6A:
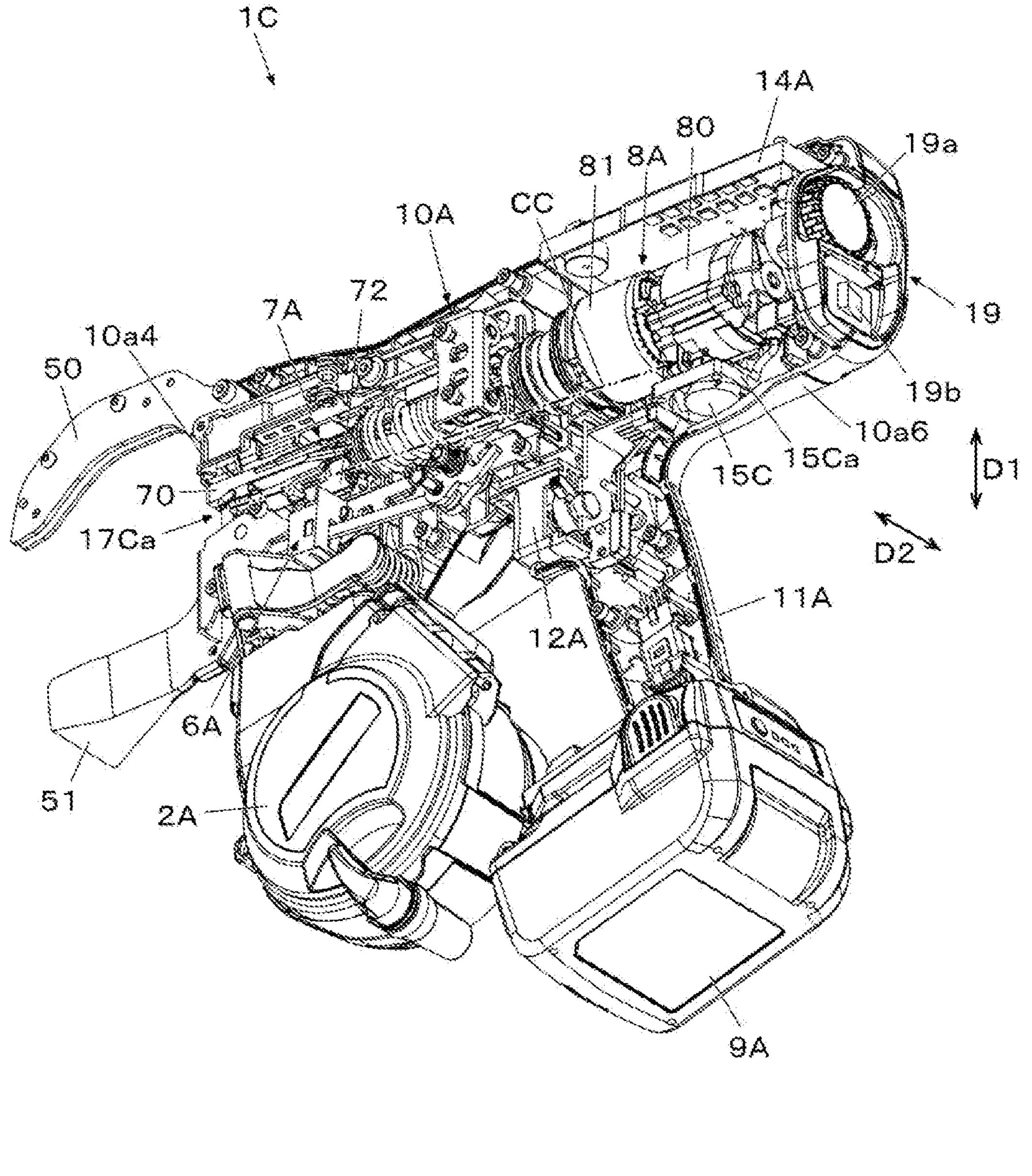
FIG. 6A is an internal configuration diagram, seen from the other side, illustrating an example of an overall configuration of a reinforcing bar binding machine according to a third embodiment.
Figure 6B:
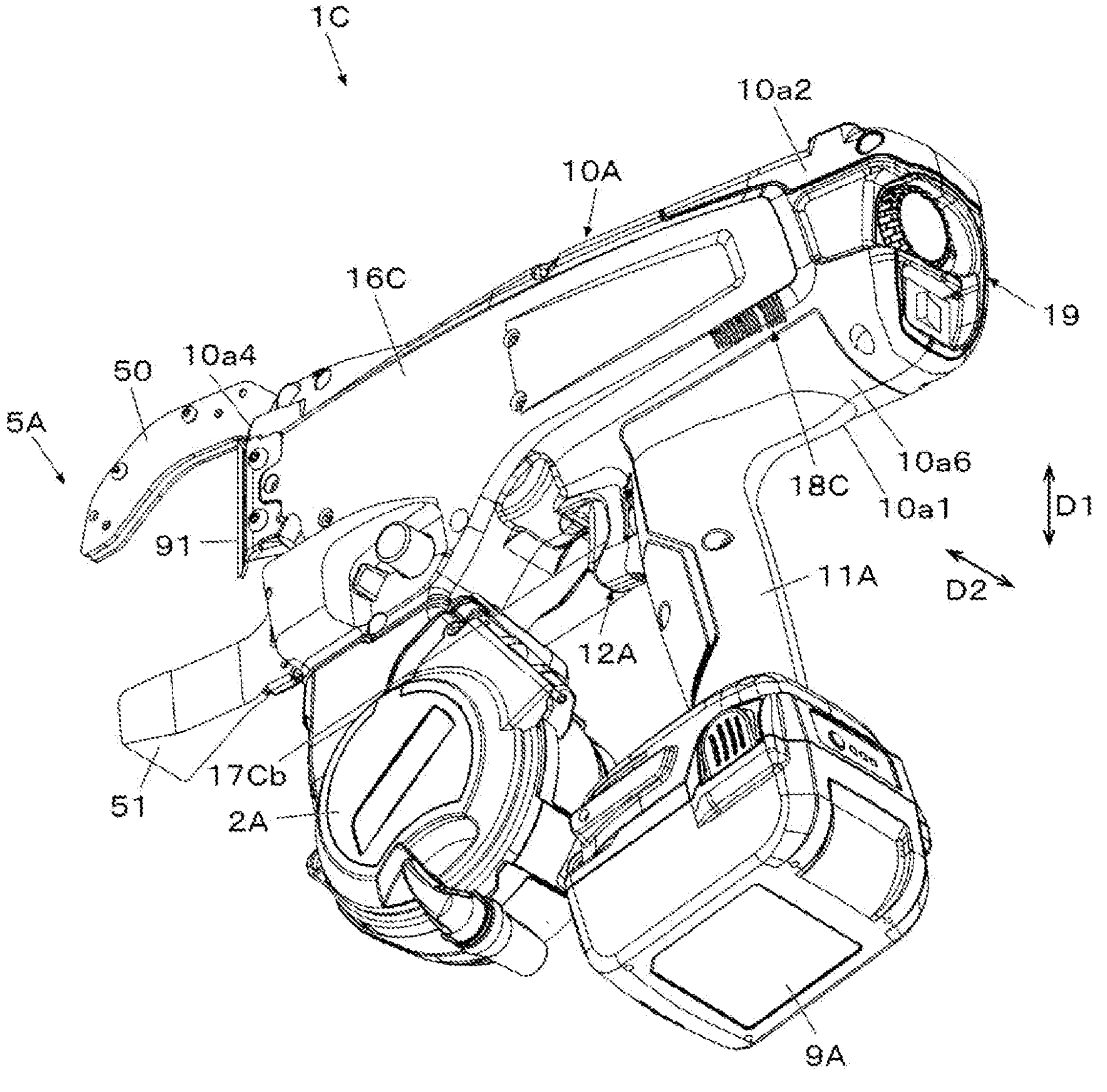
FIG. 6B is an external perspective view seen from below, illustrating an example of the overall configuration of the reinforcing bar binding machine according to the third embodiment on the other side.

FIG. 6A is an internal configuration diagram, seen from the other side, illustrating an example of an overall configuration of the reinforcing bar binding machine according to the third embodiment. FIG. 6B is an external perspective view seen from below, illustrating an example of the overall configuration of the reinforcing bar binding machine according to the third embodiment on the other side.

As illustrated in FIGS. 6A and 6B, in addition to the configurations of the wire feeder 3A, the curl forming part 5A, the cutter 6A, the binding part 7A, the main body 10A, the handle 11A, and the like described above, the reinforcing bar binding machine 1C includes the fan 15C as the example of the blower, a first intake port 17Ca, a second intake port 17Cb, and an exhaust port 18C.

The fan 15C generates an air flow passing through the main body 10A, thus cooling the motor 80 and the feed motor 31 that generate heat from driving. The fan 15C is provided on the lower surface 10*a*6 side which is an example of the one side of the main body 10A in the first direction D1, and below the periphery of the motor 80. More specifically, the fan 15C is disposed behind the handle 11A in a space surrounded by the lower surface of the motor 80 and the lower surface and the rear surface of the housing forming the main body 10A. As the fan 15C, for example, an axial flow fan, a centrifugal fan, a blower fan, and the like may be used. The fan 15C is mounted to a mounting portion 15Ca fixed at a predetermined position of the main body 10A. An opening (not illustrated) is formed in the mounting portion 15Ca at a position where the fan 15C is mounted, and the intake port of the fan 15C and the inside of the main body 10A communicate with each other through this opening.

The first intake port 17Ca sucks external air into the main body 10A by the air flow generated by the fan 15C. The first intake port 17Ca is provided on the front surface 10*a*4 side of the main body 10A, and between the base end of the curl guide 50 that is the first guide and the base end of the inductive guide 51 that is the second guide. For example, the first intake port 17Ca can be formed by a gap between the wire locking body 70 and the housing that forms the main body 10A, and a gap between the wire locking body 70 and the curl forming part 5A.

The second intake port 17Cb is provided in the gap between the trigger 12A and the main body 10A, and sucks external air into the main body 10A by the air flow generated by the fan 15C. Further, the second intake port 17Cb may be formed by a gap between switches other than the trigger 12A, such as, for example, the binding force setting unit 19*a* or the power switch 19*b* provided in the operation unit 19 disposed behind the motor 80 and the main body 10A.

The exhaust port 18C exhausts the air sucked into the main body 10A from the first intake port 17Ca or the like to the outside. The exhaust port 18C is provided on the other side surface 10*a*2 side which is the example of the other side of the main body 10A in the second direction D2 intersecting the axial direction of the rotating shaft 72 and the extending direction of the handle 11A. More specifically, the exhaust port 18C is formed on the other side surface 10*a*2 of the main body 10A in the vicinity of the motor 80 and at a position facing the one side portion of the motor 80. Further, the exhaust port 18C is formed of a plurality of openings penetrating the housing of the main body 10A in the thickness direction, and these openings are formed side by side so as to face substantially sideways and also in the front and rear directions of the other side surface 10*a*2 of the main body 10A. The exhaust port 18C may be formed with a single opening. Further, the exhaust port 18C may be provided on the one side surface 10*a*1 opposite to the other side surface 10*a*2 in the main body 10A.

In the third embodiment, a configuration is provided, in which the first intake port 17Ca is provided on the front side of the main body 10A, the exhaust port 18C is provided on the rear side of the main body 10A, and the feed motor 31 and the motor 80 are disposed between the first intake port 17Ca and the exhaust port 18C.

When the fan 15C is driven in the reinforcing bar binding machine 1C, air is sucked into the main body 10A from the first intake port 17Ca formed on the front surface 10*a*4 side of the main body 10A, and the second intake port 17Cb formed by the gap between the trigger 12A and the main body 10A. The air sucked from the first intake port 17Ca and the like flows along the rotating shaft 72 from the front side toward the rear side in the main body 10A by the air suctioning by the driving of the fan 15C, and passes above, below and to the left and right sides of the periphery of the feed motor 31 and the motor 80. In the third embodiment, as illustrated by the alternate long and short dash line in FIG. 6A, an air flow (air passage) CC from the front side toward the rear side is formed in the main body 10A. The air at the periphery of the motor 80 is sucked by the fan 15C. The sucked air is changed in its flow direction by the fan 15C from the axial direction to the lateral direction orthogonal to the axial direction, and exhausted to the outside from the exhaust port 18C provided on the other side surface 10*a*2 of the main body 10A.

With the reinforcing bar binding machine IC according to the third embodiment, external air is introduced into the main body 10A from the first intake port 17Ca, and the air with increased temperature inside the main body 10A is exhausted to the outside from the exhaust port 18C, so that it is possible to suppress the temperature rise in the main body 10A. Therefore, it is possible to suppress the temperature rise of the motor 80 and the feed motor 31. In particular, in the main body 10A, by providing the exhaust port 18C on the side of the motor 80 and the fan 15C, when the fan 15C that blows out the sucked air to the lateral direction is used, the air sucked from the first intake port 17Ca in the axial direction can be changed in its flow direction to the lateral direction, so that it is possible to efficiently exhaust the air through the exhaust port 18C provided on the side, and enhance the effect of suppressing the temperature rise of the motor 80.

Further, the reinforcing bar binding machine 1C is provided with the exhaust port 18C on the other side surface 10*a*2 of the main body 10A rather than the rear surface 10*a*3 side of the main body 10A, so that when the reinforcing bar binding machine IC is used facing sideways, the exhaust port 18C faces sideways and also when the reinforcing bar binding machine 1C is used facing downward, the exhaust port 18C faces sideways. As a result, it is possible to prevent dusts, moisture, and the like from entering through the exhaust port 18C. Further, the reinforcing bar binding machine IC is provided with the first intake port 17Ca on the front surface 10*a*4 side of the main body 10A, so that when the reinforcing bar binding machine 1C is used facing sideways, the first intake port 17Ca is not exposed upward when the reinforcing bar binding machine 1C is viewed from above. Further, when the reinforcing bar binding machine 1C is used facing downward, the first intake port 17Ca faces downward. As a result, it is also possible to prevent dusts, moisture, and the like from entering through the first intake port 17Ca.

Further, according to the third embodiment, since the feed motor 31 and the motor 80 are respectively disposed in the air flow CC between the first intake port 17Ca and the exhaust port 18C, both the feed motor 31 and the motor 80 can be efficiently cooled by the air flow CC.

Further, in the third embodiment, since the exhaust port 18C is not provided on the lower surface 10*a*6 side of the main body 10A, it is possible to prevent the air exhausted from the exhaust port 18C from coming into contact with the user's hand when the user grips the handle 11A and performs the work. As a result, even when the binding work is performed in a hot season such as summer, for example, it is possible to prevent the user from feeling uncomfortable as the air increased in temperature by the driving of the motor 80 or the like comes into contact with the user's hand, and prevent a decrease in work efficiency.

Fourth Embodiment

In the fourth embodiment, a fan 15D is provided behind the motor 80, which is different from the first embodiment in which the fan 15A is provided on the side of the motor 80. A reinforcing bar binding machine 1D of the fourth embodiment will be described below, and the duplicate description of the configurations and operations common to the reinforcing bar binding machine 1A of the first embodiment will be omitted by quoting the description of the first embodiment.

Figure 7A:
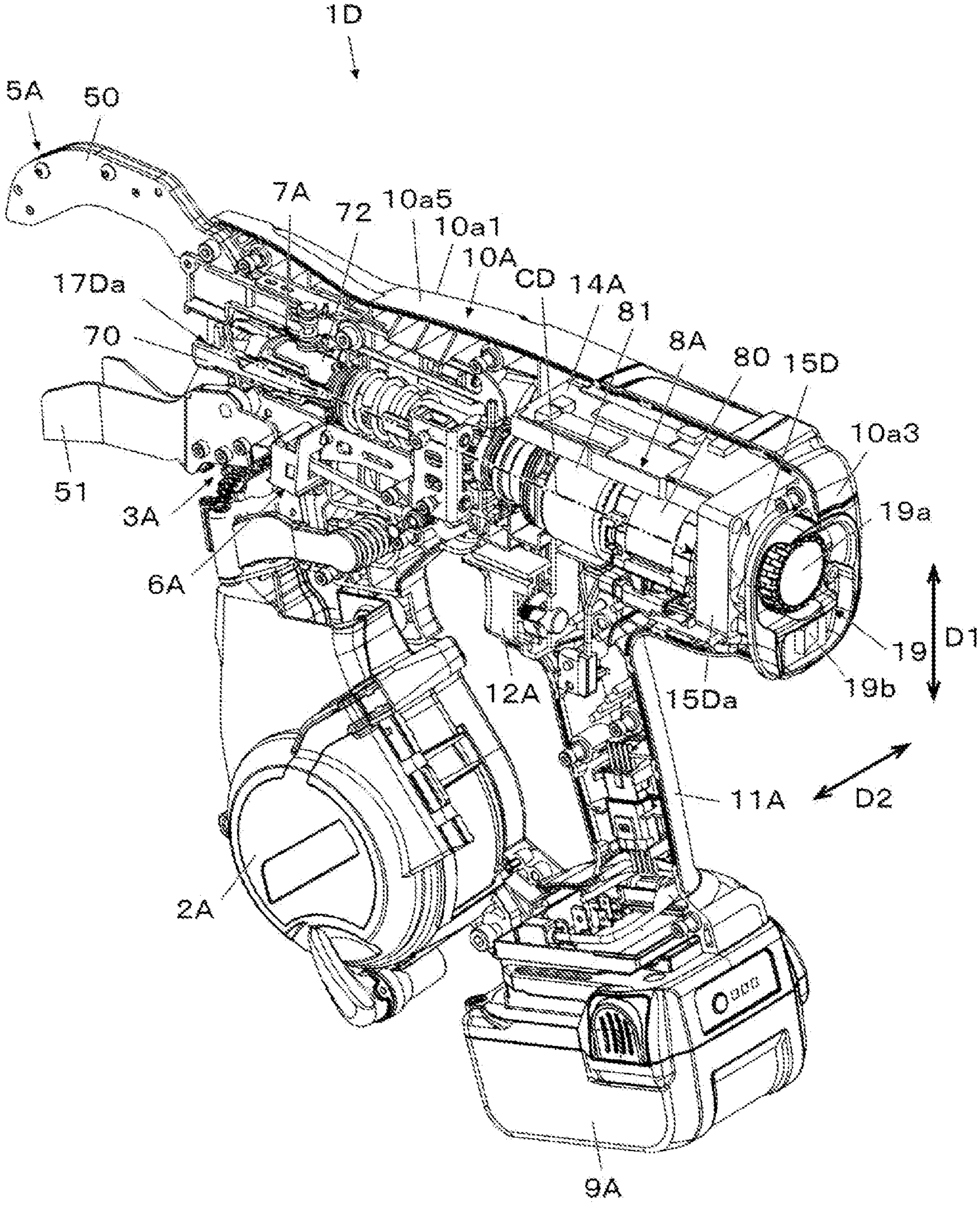
FIG. 7A is an internal configuration diagram, seen from the other side, illustrating an example of an overall configuration of a reinforcing bar binding machine according to a fourth embodiment.
Figure 7B:
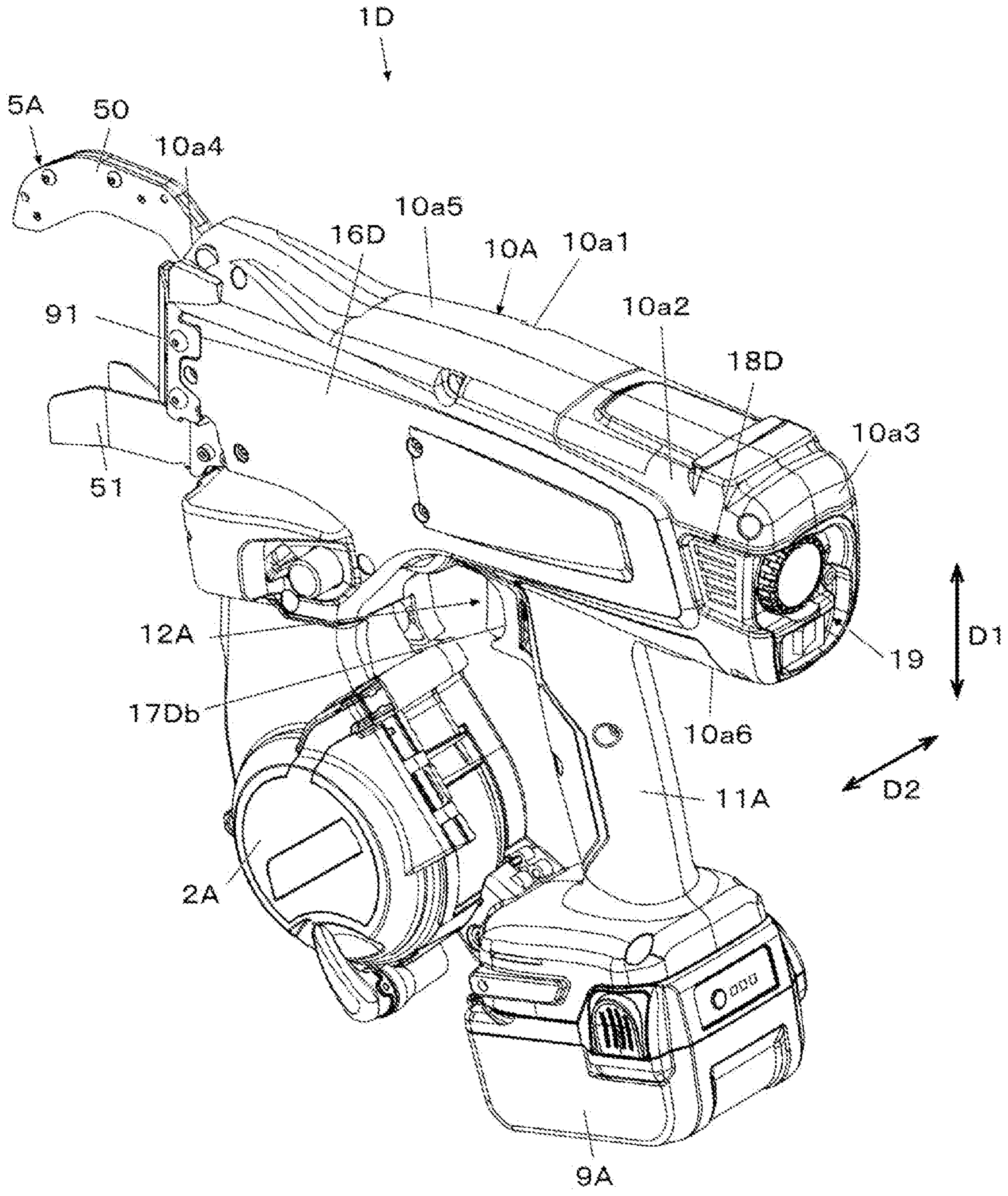
FIG. 7B is an external perspective view, seen from the other side, illustrating an example of the overall configuration of the reinforcing bar binding machine according to the fourth embodiment.

FIG. 7A is an internal configuration diagram, seen from the other side, illustrating an example of an overall configuration of the reinforcing bar binding machine according to the fourth embodiment. FIG. 7B is an external perspective view, seen from the other side, illustrating an example of the overall configuration of the reinforcing bar binding machine according to the fourth embodiment.

As illustrated in FIGS. 7A and 7B, in addition to the configurations of the wire feeder 3A, the curl forming part 5A, the cutter 6A, the binding part 7A, the main body 10A, the handle 11A, and the like described above, the reinforcing bar binding machine 1D includes the fan 15D as an example of the blower, a first intake port 17Da, a second intake port 17*db*, and an exhaust port 18D.

The fan 15D generates an air flow passing through the main body 10A, thus cooling the motor 80 and the feed motor 31 that generate heat from driving. In the main body 10A, the fan 15D is provided on the rear surface 10*a*3 side which is more toward the other side in the axial direction of the rotating shaft 72 than the motor 80, and behind the periphery of the motor 80. More specifically, the fan 15D is disposed in a space surrounded by the rear surface of the motor 80, the operation unit 19, and the upper and lower surfaces of the housing forming the main body 10A. As the fan 15D, for example, an axial flow fan, a centrifugal fan, a blower fan, and the like may be used. The fan 15D is mounted to a mounting portion 15Da fixed at a predetermined position of the main body 10A. An opening (not illustrated) is formed in the mounting portion 15Da at a position where the fan 15D is mounted, and the intake port of the fan 15D and the inside of the main body 10A communicate with each other through this opening.

The first intake port 17Da sucks external air into the main body 10A by the air flow generated by the fan 15D. The first intake port 17Da is provided on the front surface 10*a*4 side of the main body 10A, and between the base end of the curl guide 50 that is the first guide and the base end of the inductive guide 51 that is the second guide. For example, the first intake port 17Da can be formed by a gap between the wire locking body 70 and the housing that forms the main body 10A, and a gap between the wire locking body 70 and the curl forming part 5A.

The second intake port 17*db* is provided in the gap between the trigger 12A and the main body 10A, and sucks external air into the main body 10A by the air flow generated by the fan 15D. Further, the second intake port 17*db* may be formed by a gap between switches other than the trigger 12A, such as, for example, the binding force setting unit 19*a* or the power switch 19*b* provided in the operation unit 19 disposed behind the motor 80 and the main body 10A.

The exhaust port 18D exhausts the air sucked into the main body 10A from the first intake port 17Da or the like to the outside. The exhaust port 18D is provided on the other side surface 10*a*2 side which is the example of the other side of the main body 10A in the second direction D2 intersecting the axial direction of the rotating shaft 72 and the extending direction of the handle 11A. The exhaust port 18D is formed on the other side surface 10*a*2 of the main body 10A in the vicinity of the motor 80 and at a position facing the other side portion of the motor 80. The exhaust port 18D is formed of a plurality of openings penetrating the housing of the main body 10A in the thickness direction, and these openings are formed side by side so as to face sideways and also in the vertical direction of the other side surface 10*a*2 of the main body 10A. The exhaust port 18D may be formed with a single opening. Further, the exhaust port 18D may be provided on the one side surface 10*a*1 opposite to the other side surface 10*a*2 in the main body 10A.

In the fourth embodiment, a configuration is provided, in which the first intake port 17Da is provided on the front side of the main body 10A, the exhaust port 18B is provided on the rear side of the main body 10A, and the feed motor 31 and the motor 80 are disposed between the first intake port 17Da and the exhaust port 18D.

When the fan 15D is driven in the reinforcing bar binding machine 1D, air is sucked into the main body 10A from the first intake port 17Da formed on the front surface 10*a*4 side of the main body 10A, and the second intake port 17*db* formed by the gap between the trigger 12A and the main body 10A. The air sucked from the first intake port 17Da and the like flows along the rotating shaft 72 from the front side toward the rear side in the main body 10A by the air suctioning by the driving of the fan 15D, and passes above, below and to the left and right sides of the periphery of the feed motor 31 and the motor 80. As described above, in the fourth embodiment, as illustrated by the alternate long and short dash line in FIG. 7A, an air flow (air passage) CD from the front side toward the rear side is formed in the main body 10A. The air at the periphery of the motor 80 is sucked by the fan 15D. The sucked air is changed in its flow direction by the fan 15D from the axial direction to the lateral direction orthogonal to the axial direction, and exhausted to the outside from the exhaust port 18D provided on the other side surface 10*a*2 of the main body 10A.

With the reinforcing bar binding machine 1D according to the fourth embodiment, external air is introduced into the main body 10A from the first intake port 17Da, and the air with increased temperature inside the main body 10A is exhausted to the outside from the exhaust port 18D, so that it is possible to suppress the temperature rise in the main body 10A. Therefore, it is possible to suppress the temperature rise of the motor 80 and the feed motor 31. In particular, in the main body 10A, by providing the exhaust port 18D on the side of the motor 80 and the fan 15D, when the fan 15D that blows out the sucked air to the lateral direction is used, the air sucked from the first intake port 17Da in the axial direction can be changed in its flow direction to the lateral direction, so that it is possible to efficiently exhaust the air through the exhaust port 18D provided on the side, and enhance the effect of suppressing the temperature rise of the motor 80.

Further, the reinforcing bar binding machine 1D is provided with the exhaust port 18D on the other side surface 10*a*2 of the main body 10A rather than the rear surface 10*a*3 side of the main body 10A, so that when the reinforcing bar binding machine 1D is used facing sideways, the exhaust port 18D faces sideways and also when the reinforcing bar binding machine 1D is used facing downward, the exhaust port 18D faces sideways. As a result, it is possible to prevent dusts, moisture, and the like from entering through the exhaust port 18D. Further, the reinforcing bar binding machine 1D is provided with the first intake port 17Da on the front end side of the main body 10A, so that when the reinforcing bar binding machine 1D is used facing sideways, the first intake port 17Da is not exposed upward when the reinforcing bar binding machine 1D is viewed from above. Further, when the reinforcing bar binding machine 1D is used facing downward, the first intake port 17Da faces downward. As a result, it is also possible to prevent dusts, moisture, and the like from entering through the first intake port 17Da.

Further, according to the fourth embodiment, since the feed motor 31 and the motor 80 are respectively disposed in the air flow CD between the first intake port 17Da and the exhaust port 18D, both the feed motor 31 and the motor 80 can be efficiently cooled by the air flow CD.

Further, in the fourth embodiment, since the exhaust port 18D is not provided on the lower surface 10*a*6 side of the main body 10A, it is possible to prevent the air exhausted from the exhaust port 18D from coming into contact with the user's hand when the user grips the handle 11A and performs the work. As a result, even when the binding work is performed in a hot season such as summer, for example, it is possible to prevent the user from feeling uncomfortable as the air increased in temperature by the driving of the motor 80 or the like comes into contact with the user's hand, and prevent a decrease in work efficiency.

Fifth Embodiment

Figure 8A:
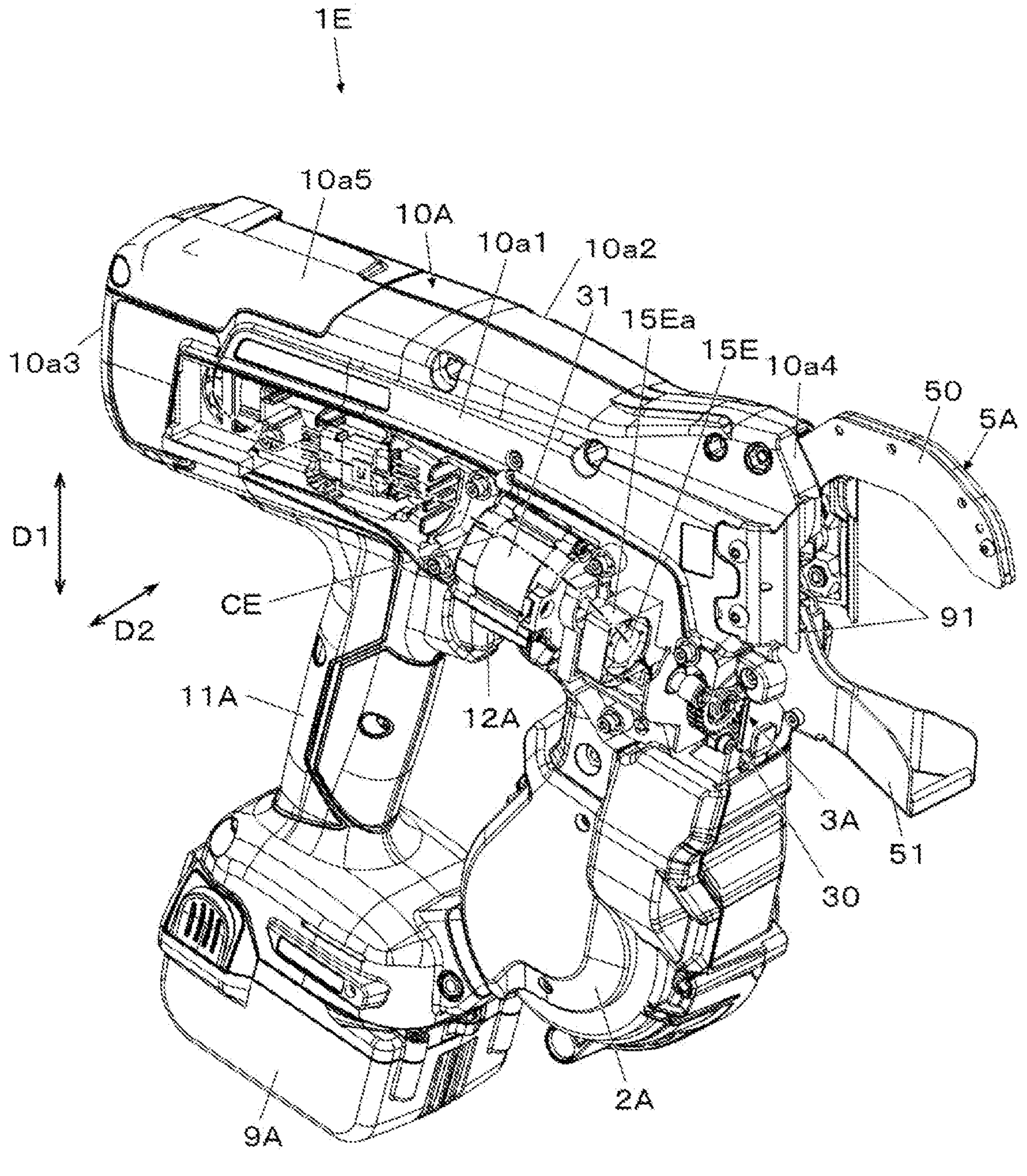
FIG. 8A is an internal configuration diagram, seen from the one side, illustrating an example of an overall configuration of a reinforcing bar binding machine according to a fifth embodiment.
Figure 8B:
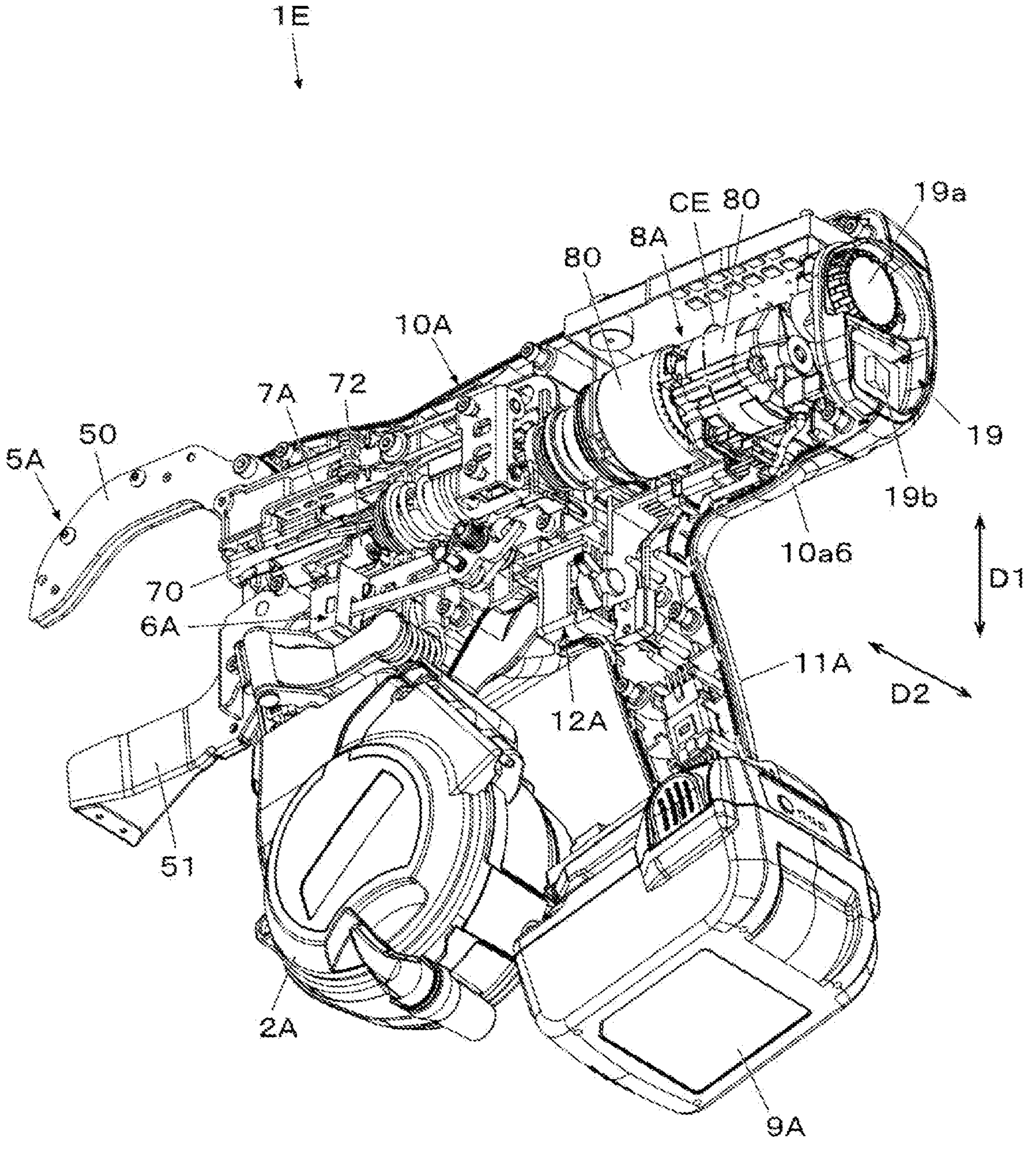
FIG. 8B is an internal configuration diagram, seen from the other side, illustrating an example of the overall configuration of the reinforcing bar binding machine according to the fifth embodiment.
Figure 8C:
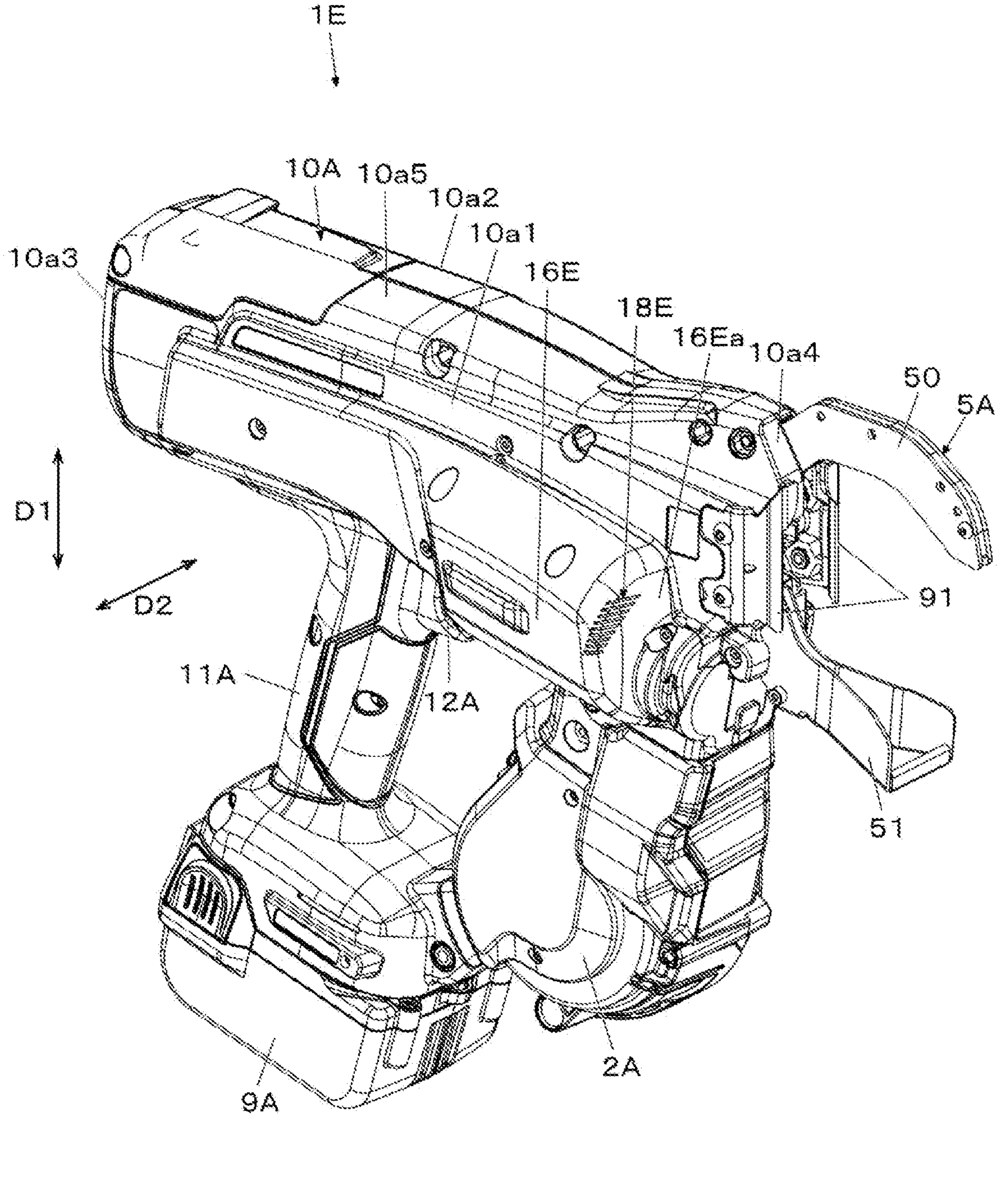
FIG. 8C is an external perspective view seen from above, illustrating an example of the overall configuration of the reinforcing bar binding machine according to the fifth embodiment on the one side.
Figure 8D:
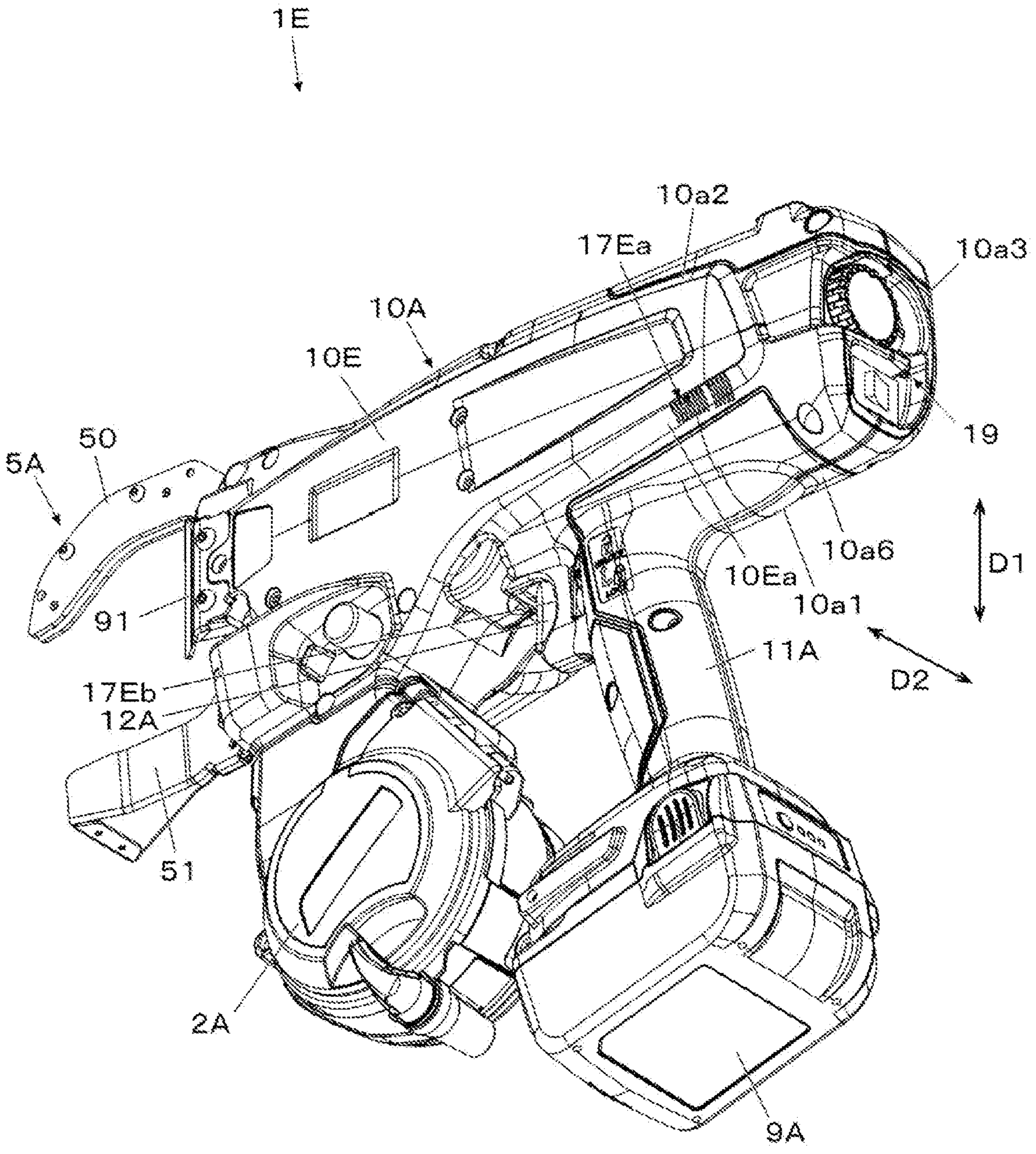
FIG. 8D is an external perspective view seen from below, illustrating an example of the overall configuration of the reinforcing bar binding machine according to the fifth embodiment on the other side.

FIG. 8A is an internal configuration diagram, seen from the one side, illustrating an example of an overall configuration of a reinforcing bar binding machine according to a fifth embodiment, FIG. 8B is an internal configuration diagram, seen from the other side, illustrating an example of an overall configuration of the reinforcing bar binding machine according to the fifth embodiment, FIG. 8C is an external perspective view, seen from the one side, illustrating an example of the overall configuration of the reinforcing bar binding machine according to the fifth embodiment, and FIG. 8D is an external perspective view, seen from the other side, illustrating an example of the overall configuration of the reinforcing bar binding machine according to the fifth embodiment.

As illustrated in FIGS. 8A to 8D, in addition to the configurations of the wire feeder 3A, the curl forming part 5A, the cutter 6A, the binding part 7A, the main body 10A, the handle 11A, and the like described above, a reinforcing bar binding machine 1E includes a fan 15E as an example of the blower, a first intake port 17Ea, a second intake port 17Eb, and an exhaust port 18E.

The fan 15E generates an air flow passing through the main body 10A, thus cooling the motor 80 and the feed motor 31 that generate heat from driving. In the main body 10A, the fan 15E is provided on the front surface 10*a*4 side which is the one side in the axial direction of the rotating shaft 72, and in front of the periphery of the feed motor 31. In the present embodiment, as illustrated in FIGS. 8A and 8C, the feed motor 31 is built in a convex portion 16E which is an example of the convex exterior portion having an outwardly protruding shape from the one side surface 10*a*1 of the main body 10A. The fan 15E is disposed inside the convex portion 16E forming the main body 10A, and in front of the feed motor 31, that is, in a space formed between the feed motor 31 and the feed gear 30. As the fan 15E, for example, an axial flow fan, a centrifugal fan, a blower fan, and the like may be used. The fan 15E is mounted to a mounting portion 15Ea fixed at a predetermined position of the main body 10A. An opening (not illustrated) is formed in the mounting portion 15Ea at a position where the fan 15E is mounted, and the intake port of the fan 15E and the inside of the main body 10A communicate with each other through this opening.

The first intake port 17Ea sucks external air into the main body 10A by the air flow generated by the fan 15E. The first intake port 17Ea is provided on the other side surface 10*a*2 side which is an example of the other side of the main body 10A in the second direction D2 intersecting the axial direction of the rotating shaft 72 and the extending direction of the handle 11A. In the present embodiment, as illustrated in FIG. 8D, a cover 10E slightly protruding outward is mounted to the other side surface 10*a*2 of the main body 10A, and a portion connecting the main body 10A and the cover 10E is a stepped portion 10Ea. The exhaust port 18E is formed in the stepped portion 10Ea of the cover 10E in the vicinity of the motor 80 and at a position facing one side portion of the motor 80. Further, the exhaust port 18E is formed of a plurality of openings penetrating the housing of the main body 10A in the thickness direction, and these openings are formed side by side so as to face substantially sideways and also in the front and rear directions of the other side surface 10*a*2 of the main body 10A. The exhaust port 18E may be formed with a single opening.

The second intake port 17Eb is provided in the gap between the trigger 12A and the main body 10A, and sucks external air into the main body 10A by the air flow generated by the fan 15E. Further, the second intake port 17Eb may be formed by a gap between switches other than the trigger 12A, such as, for example, a gap between the binding force setting unit 19*a* or the power switch 19*b* provided in the operation unit 19 disposed behind the motor 80 and the main body 10A. Further, as described in the second embodiment and the like, the gap provided in the front end of the main body 10A may be used as the intake port.

The exhaust port 18E exhausts the air sucked into the main body 10A from the first intake port 17Ea or the like to the outside. The exhaust port 18E is provided on the one side surface 10*a*1 which is an example of the one side of the main body 10A in the second direction D2 intersecting the axial direction of the rotating shaft 72 and the extending direction of the handle 11A. In the present embodiment, the exhaust port 18E is provided on a front end surface 16Ea of the convex portion 16E protruding, in front in the vicinity of the fan 15E, from the one side surface 10*a*1 opposite to the side surface where the first intake port 17Ea is provided in the main body 10A. Further, the exhaust port 18E is formed of a plurality of openings penetrating the housing forming the convex portion 16E in the thickness direction, and these openings are formed side by side in the vertical direction of the front end surface 16Ea while facing substantially forward. The exhaust port 18E may be formed with a single opening.

In the fifth embodiment, a configuration is provided, in which the first intake port 17Ea is provided on the front side of the main body 10A, the exhaust port 18E is provided on the front side of the main body 10A, and the feed motor 31 and the motor 80 are disposed between the first intake port 17Ea and the exhaust port 18E.

When the fan 15E is driven in the reinforcing bar binding machine 1E, air is sucked into the main body 10A from the first intake port 17Ea or the like formed on the other side surface 10*a*2 side of the main body 10A. The air sucked from the first intake port 17Ea and the like flows along the rotating shaft 72 from the rear side toward the front side in the main body 10A by the air suctioning by the driving of the fan 15E, and passes above, below and to the right and left sides of the periphery of the feed motor 31 and the motor 80. As described above, in the fifth embodiment, as illustrated by the alternate long and short dash line in FIGS. 8A and 8B, an air flow (air passage) CE from the rear side toward the front side is formed in the main body 10A. The air at the periphery of the motor 80 is exhausted to the outside from the exhaust port 18E provided on the one side surface 10*a*1 of the main body 10A.

With the reinforcing bar binding machine 1E according to the fifth embodiment, external air is introduced into the main body 10A from the first intake port 17Ea, and the air with increased temperature inside the main body 10A is exhausted to the outside from the exhaust port 18E, so that it is possible to suppress the temperature rise in the main body 10A. Therefore, it is possible to suppress the temperature rise of the motor 80 and the feed motor 31. In particular, in the vicinity of the position where the motor 80 is provided in the main body 10A, the exhaust port 18E is provided on the one side surface 10*a*1 of the main body 10A, thus facilitating the generation of the air flow CE around the motor 80 as indicated by the alternate long and short dash line in FIGS. 8A and 8B, and enhancing the effect of suppressing the temperature rise of the motor 80.

Further, the reinforcing bar binding machine 1E is provided with the feed motor 31 protruding from the one side surface 10*a*1 of the main body 10A, configuring a protruding portion on the one side surface 10*a*1 of the main body 10A. Therefore, the presence of the fan 15E provided on the one side surface 10*a*1 of the main body 10A would not make a difference in feeling of use.

Further, the reinforcing bar binding machine 1E is provided with the exhaust port 18E on the one side surface 10*a*1 of the main body 10A rather than the rear surface 10*a*3 side of the main body 10A, so that when the reinforcing bar binding machine 1E is used facing sideways, the exhaust port 18E faces substantially sideways and also when the reinforcing bar binding machine 1E is used facing downward, the exhaust port 18E faces sideways. As a result, it is possible to prevent dusts, moisture, and the like from entering through the exhaust port 18E. Further, the reinforcing bar binding machine 1E is provided with the first intake port 17Ea on the other side surface 10*a*2 side of the main body 10A, so that when the reinforcing bar binding machine 1E is used facing sideways, the first intake port 17Ea is not exposed upward when the reinforcing bar binding machine 1E is viewed from above. Further, when the reinforcing bar binding machine 1E is used facing downward, the first intake port 17Ea faces downward. As a result, it is possible to prevent dusts, moisture, and the like from entering through the first intake port 17Ea.

Further, according to the fifth embodiment, since the feed motor 31 and the motor 80 are respectively disposed in the air flow CE between the first intake port 17Ea and the exhaust port 18E, both the feed motor 31 and the motor 80 can be efficiently cooled by the air flow CE.

Further, in the fifth embodiment, since the exhaust port 18E is not provided on the lower surface 10*a*6 side of the main body 10A, it is possible to prevent the air exhausted from the exhaust port 18E from coming into contact with the user's hand when the user grips the handle 11A and performs the work. As a result, even when the binding work is performed in a hot season such as summer, for example, it is possible to prevent the user from feeling uncomfortable as the air increased in temperature by the driving of the motor 80 or the like comes into contact with the user's hand, and prevent a decrease in work efficiency.

The fans 15A, 15B, 15C, 15D, and 15E may be configured to be constantly driven while the power is on, or may be configured to be driven while the trigger 12A is being operated. For example, driving of the fan may be controlled under the control of the control unit 14A. Further, it is possible to provide a temperature sensor for detecting the temperature inside the main body 10A and the like, and control whether or not to drive, or control output power according to the temperature. Further, in the first to fifth embodiments described above, the example in which each of the fans 15A, 15B, 15C, 15D, and 15E is provided as a single unit in the main body 10A has been described, but embodiments are not limited thereto. For example, among the fans 15A, 15B, 15C, 15D, and 15E, two or more fans may be provided in the main body 10A in a combined manner. Further, likewise the fan 15A, the fans 15B, 15C, 15D, and 15E may also be provided with a filter for suppressing the infiltration of foreign substances such as dust particles, dusts, moisture, and the like into the main body 10A.

The invention claimed is:

1. A binding machine comprising:

a main body;

one driving part housed in the main body;

another driving part housed in the main body:

a wire feeder driven by the one driving part and configured to feed a wire;

a curl forming part for looping the wire fed by the wire feeder around an object to be bound;

a cutter configured to cut the wire wound;

a binding part including a wire locking body to which the wire is locked and a rotating shaft for operating the wire locking body, the binding part being driven by another driving part and being configured to twist the wire;

a handle provided on one side of the main body and extending at least partially in a first direction perpendicular to an axial direction of the rotating shaft;

a blower configured to generate an air flow through an inside of the main body; and an exhaust port provided on one side or another side of the main body in a second direction being perpendicular to the axial direction and perpendicular to the first direction, the exhaust port including an opening facing toward the axial direction, the exhaust port being configured to exhaust air generated by the blower and passed through the inside of the main body, wherein the one driving part is provided on one side along the axial direction, the another driving part is provided on another side along the axial direction, and the blower is provided more toward the one side in the axial direction of the rotating shaft than the one driving part.

2. The binding machine according to claim 1, wherein the blower is provided on the one side or the another side of the main body in the second direction with respect to the another driving part.

3. The binding machine according to claim 2, wherein the main body is provided with a convex exterior portion protruding laterally outward on a surface of the one side or a surface of the another side in the second direction thereof, and the blower is provided inside the convex exterior portion.

4. The binding machine according to claim 2, wherein the one driving part is provided on a surface of the one side or a surface of the another side of the main body in the second direction, and on one side along the axial direction of the rotating shaft with respect to the blower.

5. The binding machine according to claim 2, wherein a first intake port for sucking air to pass through the inside of the main body is provided on a surface of the one side or a surface of the other side of the main body opposite to a side surface on which the exhaust port is provided.

6. The binding machine according to claim 5, wherein on the one side surface or the another side surface in the second direction, the main body is provided with a convex portion protruding laterally outward at a portion connected to the handle, and a concave portion recessed inward at a portion connected between the convex portion and the handle, and the first intake port is provided in the concave portion.

7. The binding machine according to claim 5, further comprising an operation unit including a movable and operable member that receives operations and, and a second intake port provided in a gap between the main body and the operation unit, for passing air through the inside of the main body.

8. The binding machine according to claim 2, wherein the curl forming part includes a first guide and a second guide, and is provided so as to protrude from an end portion on the one side of the main body in the axial direction of the rotating shaft, and a first intake port is provided at the end portion of the one side of the main body in the axial direction of the rotating shaft and between the first guide and the second guide, for sucking air to pass through the inside of the main body.

9. The binding machine according to claim 1, wherein the blower is provided on the one side of the main body in the first direction with respect to the another driving part.

10. The binding machine according to claim 1, wherein the exhaust port is provided on the one side in the axial direction of the rotating shaft with respect to the blower.

* * * * *